(12) United States Patent
Conroy et al.

(10) Patent No.: US 8,578,189 B2
(45) Date of Patent: *Nov. 5, 2013

(54) METHODS AND APPARATUSES FOR DYNAMIC POWER CONTROL

(71) Applicant: Apple Inc., Cupertino, CA (US)

(72) Inventors: David G. Conroy, El Granada, CA (US); Keith Alan Cox, Sunnyvale, CA (US); Michael Culbert, Monte Sereno, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/708,070

(22) Filed: Dec. 7, 2012

(65) Prior Publication Data
US 2013/0103967 A1    Apr. 25, 2013

Related U.S. Application Data

(63) Continuation of application No. 12/500,997, filed on Jul. 10, 2009, now Pat. No. 8,332,665, which is a continuation of application No. 11/212,970, filed on Aug. 25, 2005, now Pat. No. 7,562,234.

(51) Int. Cl.
*G06F 1/00* (2006.01)

(52) U.S. Cl.
USPC ........... 713/300; 713/320; 713/321; 713/322; 713/323; 713/324; 713/340

(58) Field of Classification Search
USPC .......... 713/300, 320, 321, 322, 323, 324, 340
See application file for complete search history.

(56) References Cited

U.S. PATENT DOCUMENTS

| 5,167,024 A | 11/1992 | Smith et al. |
| 5,520,153 A | 5/1996 | Milunas |

(Continued)

FOREIGN PATENT DOCUMENTS

| EP | 0632 360 A1 | 1/1995 |
| GB | 2405236 A | 2/2005 |

(Continued)

OTHER PUBLICATIONS

Hashimoto, Clock-up, Silencing of the machine . . . Get 120% performance Free-of-charge tune of the motherboard by software, DOS/V Power Report, vol. 14, No. 6, Japan, Impress Corporation, vol. 14, p. 73.

(Continued)

*Primary Examiner* — Jaweed A Abbaszadeh
(74) *Attorney, Agent, or Firm* — Blakely, Sokoloff, Taylor & Zafman LLP

(57) ABSTRACT

Methods and apparatuses for dynamically budgeting power usage in a data processing system. In one aspect, a data processing system, includes: one or more first components capable of being dynamically throttled to a plurality of different performance level settings; one or more second components; and one or more power usage sensors. The one or more power usage sensors are to determine information on power usage during a first time period of operation of the data processing system. The one or more first components and the one or more second components may include a computing element to determine one of the performance level settings of the one or more first components of the data processing system for a second time period subsequent to the first time period using the information on the power usage during the first time period.

14 Claims, 17 Drawing Sheets

(56) References Cited

U.S. PATENT DOCUMENTS

| | | | |
|---|---|---|---|
| 5,532,935 A | 7/1996 | Ninomiya et al. | |
| 5,532,945 A | 7/1996 | Robinson | |
| 5,560,022 A | 9/1996 | Dunstan et al. | |
| 5,627,412 A | 5/1997 | Beard | |
| 5,812,860 A | 9/1998 | Horden | |
| 5,825,674 A | 10/1998 | Jackson | |
| 5,842,027 A | 11/1998 | Oprescu et al. | |
| 5,915,838 A | 6/1999 | Stals et al. | |
| 5,963,424 A | 10/1999 | Hileman et al. | |
| 5,964,879 A | 10/1999 | Dunstan et al. | |
| 6,122,758 A | 9/2000 | Johnson et al. | |
| 6,134,667 A | 10/2000 | Suzuki et al. | |
| 6,270,252 B1 | 8/2001 | Siefert | |
| 6,415,388 B1 | 7/2002 | Browning et al. | |
| 6,477,156 B1 | 11/2002 | Ala-Laurila et al. | |
| 6,594,771 B1 | 7/2003 | Koerber et al. | |
| 6,718,474 B1 | 4/2004 | Somers et al. | |
| 6,745,117 B1 | 6/2004 | Thacher et al. | |
| 6,888,332 B2 | 5/2005 | Matsushita | |
| 6,925,573 B2 | 8/2005 | Bodas | |
| 6,952,782 B2 | 10/2005 | Staiger | |
| 6,986,069 B2 | 1/2006 | Oehler et al. | |
| 7,036,027 B2 | 4/2006 | Kim et al. | |
| 7,071,668 B2 * | 7/2006 | Sasaki | 323/290 |
| 7,111,178 B2 | 9/2006 | Rusu et al. | |
| 7,134,029 B2 | 11/2006 | Hepner et al. | |
| 7,139,920 B2 * | 11/2006 | Williams | 713/300 |
| 7,162,651 B2 | 1/2007 | Brockhaus | |
| 7,171,570 B2 | 1/2007 | Cox et al. | |
| 7,171,572 B2 * | 1/2007 | Yamaji et al. | 713/320 |
| 7,177,728 B2 | 2/2007 | Gardner | |
| 7,178,043 B2 | 2/2007 | Nakazato | |
| 7,194,646 B1 | 3/2007 | Watts, Jr. | |
| 7,228,448 B2 * | 6/2007 | Anderson et al. | 713/340 |
| 7,272,732 B2 | 9/2007 | Farkas et al. | |
| 7,295,949 B2 | 11/2007 | Vorenkamp et al. | |
| 7,353,133 B2 | 4/2008 | Park | |
| 7,383,451 B2 | 6/2008 | Matsushima et al. | |
| 7,421,598 B2 | 9/2008 | Brittain et al. | |
| 7,421,601 B2 | 9/2008 | Bose et al. | |
| 7,451,332 B2 | 11/2008 | Culbert et al. | |
| 7,549,177 B2 * | 6/2009 | Diefenbaugh et al. | 726/36 |
| 7,562,234 B2 | 7/2009 | Conroy et al. | |
| 7,640,760 B2 | 1/2010 | Bash et al. | |
| 7,788,516 B2 | 8/2010 | Conroy et al. | |
| 7,802,120 B2 | 9/2010 | Conroy et al. | |
| 2001/0021217 A1 | 9/2001 | Gunther et al. | |
| 2002/0007463 A1 | 1/2002 | Fung | |
| 2002/0020755 A1 | 2/2002 | Matsushita | |
| 2002/0065049 A1 | 5/2002 | Chauvel et al. | |
| 2002/0083354 A1 | 6/2002 | Adachi | |
| 2002/0099962 A1 | 7/2002 | Nakamura | |
| 2002/0143488 A1 | 10/2002 | Cooper et al. | |
| 2002/0149911 A1 | 10/2002 | Bishop et al. | |
| 2002/0194509 A1 | 12/2002 | Plante et al. | |
| 2003/0053293 A1 | 3/2003 | Beitelmal et al. | |
| 2003/0126475 A1 | 7/2003 | Bodas | |
| 2003/0188210 A1 | 10/2003 | Nakazato | |
| 2004/0003301 A1 | 1/2004 | Nguyen | |
| 2004/0003303 A1 | 1/2004 | Oehler et al. | |
| 2004/0044914 A1 | 3/2004 | Gedeon | |
| 2004/0064745 A1 | 4/2004 | Kadambi | |
| 2004/0088590 A1 | 5/2004 | Lee et al. | |
| 2004/0117680 A1 | 6/2004 | Naffziger | |
| 2004/0133816 A1 | 7/2004 | Miyairi | |
| 2004/0148528 A1 | 7/2004 | Silvester | |
| 2004/0159240 A1 | 8/2004 | Lyall | |
| 2004/0163001 A1 | 8/2004 | Bodas | |
| 2004/0181698 A1 | 9/2004 | Williams | |
| 2004/0210787 A1 | 10/2004 | Cox et al. | |
| 2005/0015764 A1 | 1/2005 | Gaur | |
| 2005/0055590 A1 | 3/2005 | Farkas et al. | |
| 2005/0102539 A1 | 5/2005 | Hepner et al. | |
| 2005/0132371 A1 | 6/2005 | Lopez-Estrada | |
| 2005/0136989 A1 | 6/2005 | Dove | |
| 2005/0138440 A1 | 6/2005 | Barr et al. | |
| 2005/0143865 A1 | 6/2005 | Gardner | |
| 2005/0149540 A1 | 7/2005 | Chan et al. | |
| 2005/0182986 A1 | 8/2005 | Anderson et al. | |
| 2005/0210304 A1 | 9/2005 | Hartung et al. | |
| 2005/0240786 A1 | 10/2005 | Ranganathan | |
| 2005/0278556 A1 | 12/2005 | Smith et al. | |
| 2005/0283683 A1 | 12/2005 | Abedi et al. | |
| 2006/0005057 A1 | 1/2006 | Nalawadi et al. | |
| 2006/0036878 A1 | 2/2006 | Rothman et al. | |
| 2006/0047983 A1 | 3/2006 | Aleyraz et al. | |
| 2006/0098463 A1 | 5/2006 | Baurle et al. | |
| 2006/0168456 A1 | 7/2006 | Chaudhry et al. | |
| 2006/0190745 A1 | 8/2006 | Matsushima et al. | |
| 2006/0190749 A1 | 8/2006 | He et al. | |
| 2006/0248354 A1 | 11/2006 | Pineda De Gyvez et al. | |
| 2006/0288241 A1 | 12/2006 | Felter et al. | |
| 2006/0294400 A1 | 12/2006 | Diefenbaugh et al. | |
| 2007/0016706 A1 | 1/2007 | Arnold et al. | |
| 2007/0049134 A1 | 3/2007 | Conroy et al. | |
| 2007/0050644 A1 | 3/2007 | Merkin | |
| 2007/0067136 A1 | 3/2007 | Conroy et al. | |
| 2007/0083779 A1 | 4/2007 | Misaka et al. | |
| 2008/0276111 A1 | 11/2008 | Jacoby et al. | |
| 2010/0040085 A1 | 2/2010 | Olderdissen et al. | |
| 2010/0115293 A1 | 5/2010 | Rotem et al. | |
| 2011/0001358 A1 | 1/2011 | Conroy et al. | |
| 2011/0154064 A1 | 6/2011 | Niekrewicz et al. | |

FOREIGN PATENT DOCUMENTS

| | | |
|---|---|---|
| JP | 2002-163038 | 6/2002 |
| JP | 2002-175131 | 6/2002 |
| JP | 2003-514296 A | 4/2003 |
| JP | 2003-295986 | 10/2003 |
| JP | 2005-071364 A | 3/2005 |
| WO | WO 01/35200 | 5/2001 |
| WO | WO 03/060678 A2 | 7/2003 |
| WO | WO 2006/019973 A1 | 2/2006 |
| WO | WO 2007/024403 A2 | 3/2007 |

OTHER PUBLICATIONS

PCT International Preliminary Report on Patentability and Written Opinion for PCT Int'l. Application No. PCT/US2006/029244, mailed Mar. 6, 2008, (14 pages).

PCT International Search Report and Written Opinion for PCT Int'l. Application No. PCT/US2006/029244, mailed Sep. 17, 2007, (22 pages).

PCT International Search Report and Written Opinion for PCT Int'l. Application No. PCT/US2008/013975 mailed Mar. 17, 2009, (13 pages).

PCT International Search Report and Written Opinion for PCT Int'l. Application No. US2006/029049, mailed Nov. 29, 2006, (14 pages).

PCT Preliminary Report on Patentability and Written Opinion for PCT Int'l. Application No. PCT/US2006/029049, mailed Mar. 6, 2008, (10 pages).

PCT International Search Report and Written Opinion for PCT Int'l. Application No. US2008/014036, mailed Jul. 22, 2010, (14 pages).

Hashimoto, Clock-up, Silencing of the machine . . . Get 120% performance Free-of-charge tune of the motherboard by software, DOS/V Power Report, vol. 14, No. 6, Japan, Impress Corporation, vol. 14, p. 73, Jun. 2004.

* cited by examiner

METHODS AND APPARATUSES FOR DYNAMIC POWER CONTROL

RELATED APPLICATIONS

This application is a continuation of co-pending U.S. patent application Ser. No. 12/500,997, filed on Jul. 10, 2009, which is a continuation of U.S. patent application Ser. No. 11/212,970, filed on Aug. 25, 2005, entitled "Methods and Apparatuses for Dynamic Power Control," and now issued as U.S. Pat. No. 7,562,234.

TECHNOLOGY FIELD

At least some embodiments of the present invention relate generally to data processing systems, and more particularly but not exclusively to the management of power usage in data processing systems.

BACKGROUND

Traditionally, computer systems are designed to be able to continuously run a fairly worst-case power load. Design according to such a continuous worst-case power load has never been much of a problem, because traditionally the individual components have had modest operating powers and the computer systems have had large power budgets so that the systems could sustain the load fairly naturally.

As the operating power consumptions of the individual components of computer system creep upwards, the power budgets of the computer systems have become tighter. It is now becoming a challenge to design a computer system to run a continuous worst-case workload while pursuing other high performance goals, such as high computing power, compactness, quietness, better battery performance, etc. For example, portable computer systems, such as laptop computers, have a limited battery output capability; and thus a worst-case workload for a given battery output capability may limit the performance of the system because the worst case workload may rarely occur.

SUMMARY OF THE DESCRIPTION

Methods and apparatuses for dynamically budgeting power usage in a data processing system are described here. Some embodiments of the present invention are summarized in this section.

In one aspect of an embodiment of the present invention, a data processing system, includes: one or more first components capable of being dynamically throttled to a plurality of different performance level settings; one or more second components coupled to the one or more first components; and one or more power usage sensors coupled to the one or more first components and the one or more second components. The one or more power usage sensors are used to determine information on power usage during a first time period of operation of the data processing system. The data processing system includes a computing element to determine one of the performance level settings of the one or more first components of the data processing system for a second time period, which is subsequent to the first time period, using the information on the power usage during the first time period.

In one example of an embodiment, the one or more first components, the one or more second components, and the one or more power usage sensors are within a housing for the data processing system. In one example, the data processing system is portable.

In one example of an embodiment, the computing element includes one of: a microcontroller; and a Central Processing Unit (CPU) microprocessor.

In one example of an embodiment, the one or more first components includes a microprocessor having a plurality of performance level settings at a plurality of core voltages and a plurality of core frequencies. The microprocessor may be a Central Processing Unit (CPU) microprocessor and/or a Graphical Processing Unit (GPU) microprocessor.

In one example of an embodiment, the one of the performance level settings is determined to limit a power usage indicator under a threshold in the second time period; and the power usage indicator represents a function of power usage over a period of time including the first time period and the second time period.

In one example of an embodiment, the computing element further determines an estimated power usage used by the one or more second components in the second time period; and the one of the performance level settings is determined from the threshold, the estimated power usage used by the one or more second components, and the information on the power usage during the first time period.

In one example of an embodiment, the one or more first components include a plurality of first components with independent adjustable performance level settings; and a performance level setting of each of the plurality of first components is determined using the information on the power usage during the first time period, the threshold and the estimated power usage used by the one or more second components.

In one example of an embodiment, the one or more power usage sensors includes: a first sensor to determine first information on power usage used by the one or more first components during the first time period; and a first sensor to determine second information on power usage used by the one or more second components during the first time period. The estimated power usage may be determined based on the second information on power usage used by the one or more second components during the first time period.

In one example of an embodiment, the information on the power usage includes indicators of currents and/or voltages at the plurality of time instances in the first time period; the one or more power usage sensors determine information indicating actual current and/or voltage drawn at a plurality of time instances in the first time period.

In one aspect of an embodiment of the present invention, a method to manage power usage in a data processing system, includes: determining information on power usage during a first time period of operation of the data processing system; and determining a performance level setting of a component of the data processing system for a second time period, which is subsequent to the first time period, using the information on the power usage during the first time period.

In one example of an embodiment, the performance level setting is determined to limit a power usage indicator under a threshold in the second time period; and the power usage indicator is a function of a history of power usage in the data processing system.

In one example of an embodiment, the data processing system includes one or more first components to be throttled in performance levels and one or more second components not to be throttled in performance levels; and the method further includes: determining an estimated power usage used by the one or more second components in the second time period. The performance level setting in the second time period is determined from the threshold, the estimated power usage used by the one or more second components, and the information on the power usage during the first time period.

In one example of an embodiment, the one or more first components include a plurality of first components; and a performance level setting of each of the plurality of first components is determined using the information on the power usage during the first time period, the threshold and the estimated power usage used by the one or more second components.

In one example of an embodiment, determining the performance level setting includes: determining an allowable power budget in the second time period for the one or more first components of the data processing system based on the threshold, the estimated power usage used by the one or more second components, and the information on the power usage during the first time period.

In one example of an embodiment, the information on the power usage during the first time period includes: first information on power usage used by the one or more first components during the first time period; and second information on power usage used by the one or more second components during the first time period. In one example, the estimated power usage may be determined based on the second information on power usage used by the one or more second components during the first time period.

In one example of an embodiment, the power usage indicator represents a function of power usage over a period of time including the first time period and the second time period. In one example, determining the information on the power usage during the first time period includes determining information indicating actual power usage at a plurality of time instances in the first time period. In one example, the information indicating actual power usage includes indicators of currents and/or voltages at the plurality of time instances in the first time period.

The present invention includes methods and apparatuses which perform these methods, including data processing systems which perform these methods, and computer readable media which when executed on data processing systems cause the systems to perform these methods.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

DETAILED DESCRIPTION

The following description and drawings are illustrative of the invention and are not to be construed as limiting the invention. Numerous specific details are described to provide a thorough understanding of the present invention. However, in certain instances, well known or conventional details are not described in order to avoid obscuring the description of the present invention. References to one or an embodiment in the present disclosure are not necessarily references to the same embodiment; and, such references mean at least one.

In one embodiment of the present invention, it is recognized that power consumptions in a computer system typically change frequently during typical usages. Typically, not all components are simultaneously in the maximum power consumption mode. Further, some components may not be in the maximum power consumption mode continuously for a long period of time. The power consumption of a component, such as the central processing unit (CPU) microprocessor, changes dramatically over time in typical usages. For example, in the prior art, the power supplies or a battery pack of computer system were designed to produce enough power to satisfy a worst case scenario in which all of the components of the computer system were drawing their maximum (in this case, worst level) amount of power. This worst case scenario essentially adds together the worst case, maximum level, power consumption; and the design takes this scenario into account when selecting a power supply or a battery pack. Thus, designing a computer system to sustain the worst-case load can be overly conservative for typical usages.

In one embodiment of the present invention, a computer system is designed to optimize various design goals for typical usages. However, worst-case load cases can occur. To avoid damage to the computer system, a dynamic power management system is used to dynamically budget the power usage of at least some of the components of the computer system such that, when the heavy tasks are imposed on the system, the system can trade performance for power consumption to stay within the power usage limit.

Figure 1:
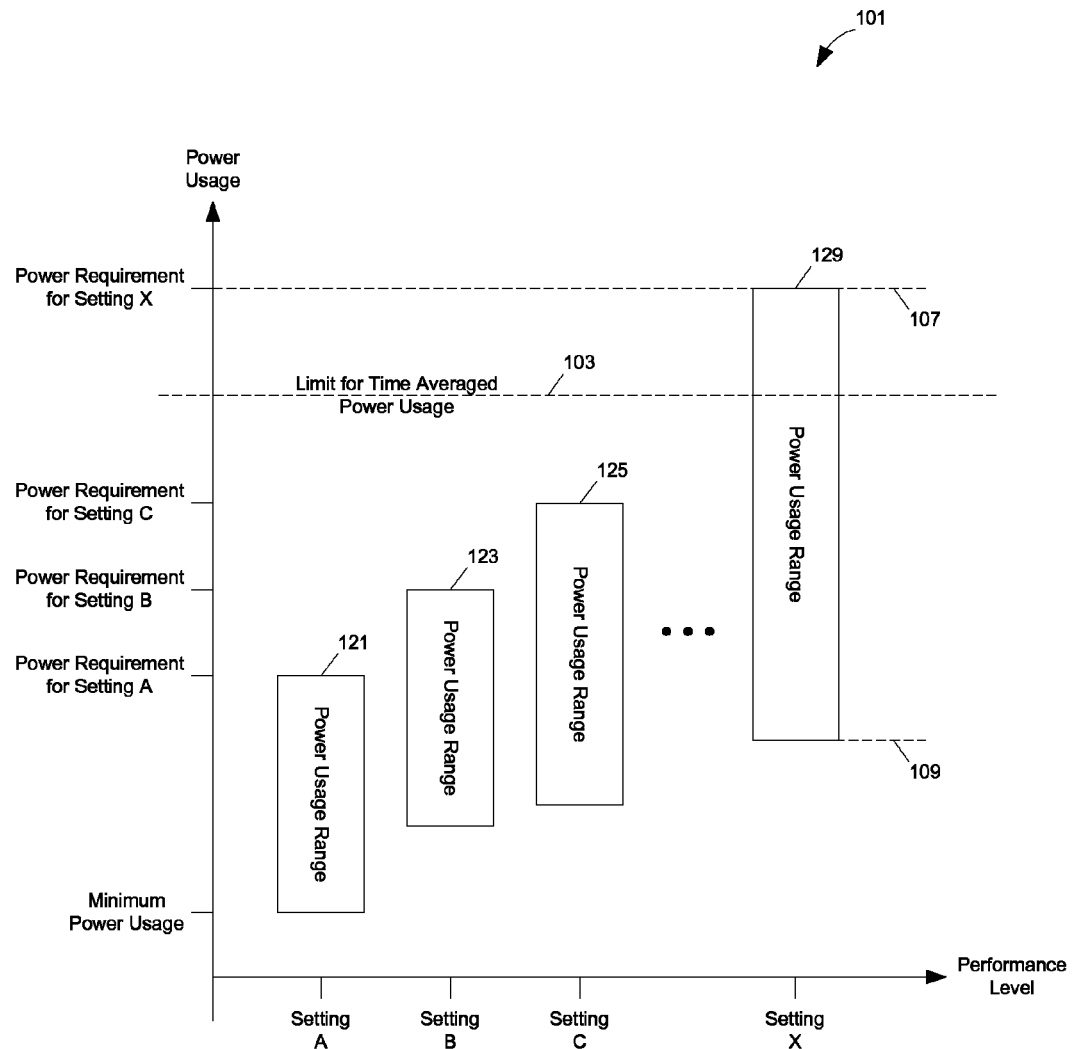
FIG. 1 illustrates a method to dynamically control power usage according to one embodiment of the present invention.

FIG. 1 illustrates a method to dynamically control power usage according to one embodiment of the present invention.

In FIG. 1, a computer system has a number of different throttle settings. For example, the CPU processor of the computer system may be set to run under different core voltages and/or different core frequencies such that the system can be fully functional but at different performance levels to trade power usage and computing performance.

Typically, different throttle settings correspond to different performance levels. Further, different settings have different power requirements (e.g., 121, 123, 125, ..., 129).

The power requirement at each setting is the maximum possible power usage at the corresponding setting. However, depending on the tasks being performed, the actual power consumptions can vary within a range.

For example, at setting X, the power usage range (129) is between the minimum possible power consumption (109) (e.g., when the system is in idle) and the maximum power consumption (107) (e.g., when the system is fully busy).

In one embodiment of the present invention, the system is so designed that the limit (103) for time averaged power usage is less than the power requirement (107) for setting X. Thus, if the system were allowed to be fully busy for a long period of time, the system might be damaged. However, it is recognized that in a typical usage the average of the dynamic power usage range (129) may be lower than the limit (103) so that the system can be in the setting X for a long period of time for high performance.

In one embodiment of the present invention, when the system receives a task that requires the system to be fully busy for a long period of time, the system automatically switches to a different setting (e.g., setting C) such that the limit (103) is not violated.

One embodiment of the present invention dynamically budgets the power usage for components of a data processing system, which may have a power usage constraint, such as thin-and-light portables computers, or larger portables, and/or small consumer desktops. For example, the constraint of heat dissipation on a computer system with a compact housing may limit the power usage. For example, to maintain the performance of a battery pack, there is a limit on average battery discharge current. Although the battery may allow a much higher instantaneous discharge current, the battery may have a much lower limit on average discharge current for a period of time to prevent significantly degrading the performance of the battery, or causing irreversible damage to the battery.

In one embodiment of the present invention, computer systems (e.g., portable computers or desktop computers) are designed for typical usages and may not sustain a continuous worst-case power load for a long period of time. Typically, a burst of computer tasks may require an instantaneous peak power load, which lasts only for a short period of time before the tasks are completed. Before and after the burst of the tasks, the computer system typically consumes a power load that is much lower than the worst-case power load. Since certain power usage limits are not based on the instantaneous power usage (e.g., the power limits based on thermal/heat dissipation constraint, based sustainable battery discharge current, etc.), such a temporary burst of tasks may be tolerable to allow high performance under tight power budget for typically usages.

Thus, with at least certain embodiments of the invention, performance levels (and power consumption levels) are set, for a short period of time (e.g., burst activity periods), to exceed a continuous state power capacity of the system (e.g., a power supply, or a battery pack). Traditionally, a computer system is designed according to the continuous worst-case workload; thus, no power usage range is allowed to exceed a limit for maximum continuous usage of a power supply (e.g., the capacity of a power supply to sustain a continuous state of constant power usage). For example, in a traditional design, no power usage range would exceed the limit (103), since the worst-case workload is traditionally treated as a continuous constant load. In one embodiment of the present invention, one or more power usage ranges (e.g., 129) is allowed to exceed the limit (103) for a limited continuous period of time. In one embodiment of the present invention, the power usage of the system is managed such that the actual power usage is in average (e.g., over a time window based on a time constant of the power supper) below the limit (103).

Although the power stack-ups which happen under worst-case power load can happen, they rarely do happen. Far more often one encounters a situation where some parts of the computer system are operating at full power, and other parts of the system are operating at low power. For example, when one is performing a scientific computation, the processor and the memory are very busy and are consuming close to full power, but the optical disk drive is empty and is consuming close to no power. When one is playing a DVD, the optical disk drive is consuming close to full power because it is reading the DVD, and the display is also consuming close to full power because it is very bright, but the processor and memory are consuming only modest power because decoding a DVD is not a very demanding application.

In one embodiment of the present invention, the power of a computer system is redistributed and throttled dynamically to ensure that the actual power usage is within the power usage constraints.

In one embodiment of the present invention, dynamic power redistribution is used to design a computer system for a typical power load over some averaging interval, as opposed to designing it for a continuous worst-case power load. Because a typical power load, in an average sense, is less than a worst-case power load, the system designed in this way can be constructed from higher-power components (which may be cheaper, or may have higher performance), or can be made physically smaller.

Because worst-case power stack-ups rarely do happen, a system designed in this fashion performs as well as a system designed in the traditional way in all but the most pathological situations. Unfortunately, worst-case power stack-ups can happen. Since a system designed for typical power cannot naturally handle worst-case conditions, one embodiment of the present invention uses throttling to ensure that the power constraints are not violated.

For example, in FIG. 1, the system dynamically determine the "best" allowable setting according to the actual past power usage information to ensure that even if the computer is fully busy in the next time interval at the selected setting, the limit (103) will not be violated.

In one embodiment of the present invention, the system implements controls (throttles) on a subset of its subsystems which limit the maximum power that could be consumed by those subsystems. Adjusting the throttle settings can adjust the maximum power a subsystem (component) can use. Typically, these throttles limit the performance of the subsystem. For example, different throttle settings may be designed for different performance levels of the subsystem; and the power usage is limited as a side effect.

For example, the CPU (central processing unit) microprocessor may work using different core voltages and core frequencies. Using a high core voltage and a high frequency, the microprocessor can be optimized for computational performance but it has high power consumption. Using a low core voltage and a low frequency, the microprocessor can be optimized for battery performance at a degraded computational performance level.

In one embodiment, the microprocessor can shift from one core voltage level to another and from one frequency to another through slowly changing the voltage and through slowly change the frequency, without stopping or pausing the computational tasks of the processor. Typically, the voltage and the frequency are changed separately. For example, to move from a high frequency and a high core voltage to a low frequency and a low core voltage, the system changes the frequency while at the high voltage and then changes the voltage while at the low frequency. For example, to move from a low frequency and a low core voltage to a high frequency and a high core voltage, the system changes the voltage while at the low frequency and then changes the frequency while at the high voltage. Further details on changing CPU core voltage and frequency can be found in U.S. patent application Ser. No. 10/917,719, filed Aug. 12, 2004, which is hereby incorporated herein by reference.

In one embodiment of the present invention, the system dynamically redistributes power and sets these throttles so that even when the worst-case power load for these throttles occurs, the maximum power consumed over the averaging interval does not exceed the limit. Since worst-case power loads are rare, the throttle controls can normally be set to very high values, such that the system acts as if the limit does not exist when the demand of the system is lower than the dynamically determined budget.

Figure 2:
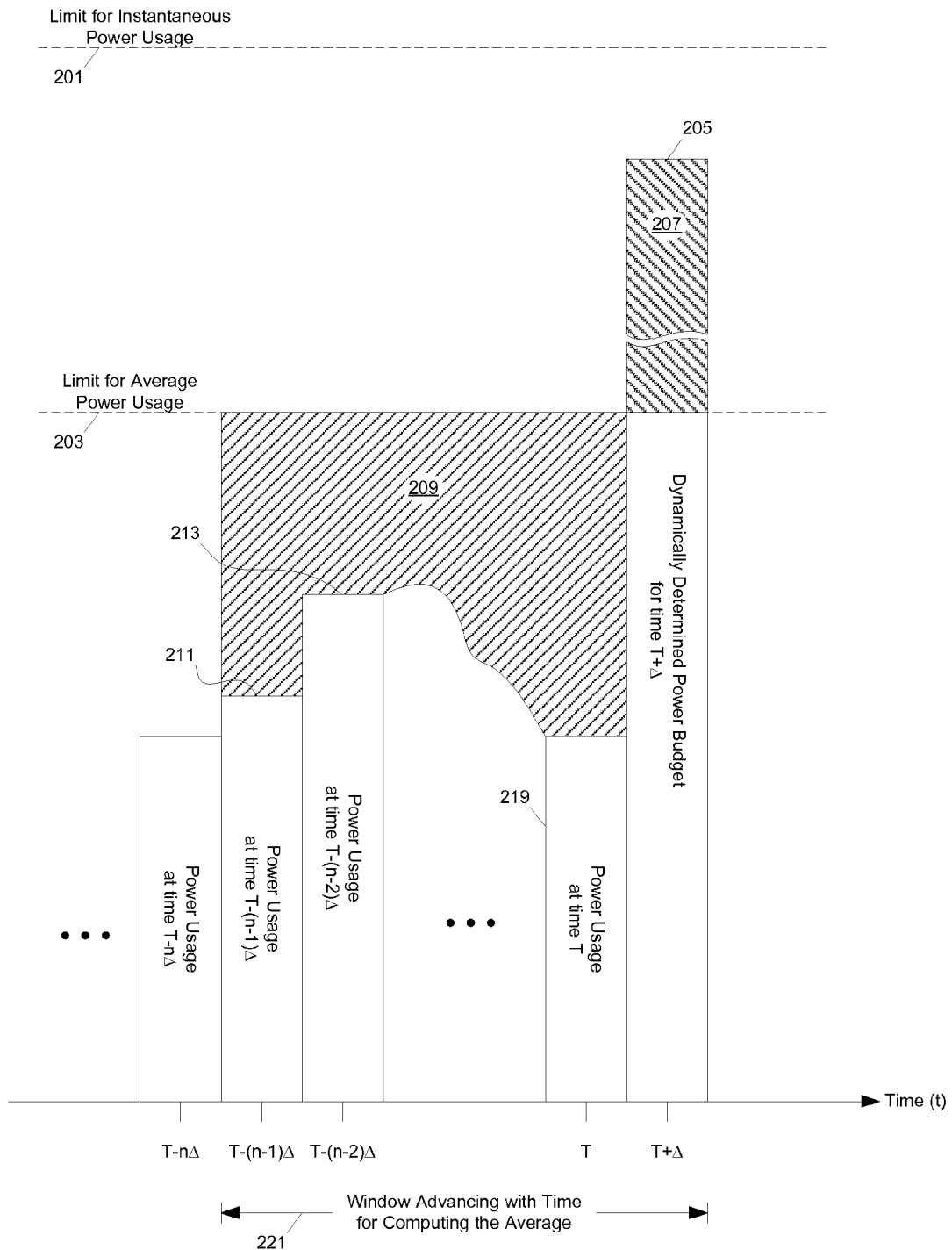
FIG. 2 illustrates a method to dynamically determine power usage budget according to one embodiment of the present invention.

FIG. 2 illustrates a method to dynamically determine power usage budget according to one embodiment of the present invention.

In FIG. 2, actual power usages are monitored. For example, the actual power usage can be measured periodically to determine the history of the power usage. The history of the power usage can be used to determine the power usage in certain averaged ways.

In one embodiment of the present invention, with the knowledge of the past power usage (e.g., measurements 211, 213, . . . , 219 at times $T-(n-1)\Delta, T-(n-2)\Delta, \ldots, T$) the system can dynamically determine the allowable power budget for the next time interval (e.g., for time $T+\Delta$).

For example, the limit (203) may be a simple average in a time window (221) of a time period $(n+1)\Delta$ (e.g., less than 10 seconds). Thus, in the example of FIG. 2, the actual past power usage (e.g., 211, 213, . . . , 219) can be used to determine the power budget (205) such that the area (207) of the power budget that is above the limit (203) is equal to or less than the area (209) between the limit (203) for average power usage (203) and the curve of the past power usage.

The system is then throttled to a setting that will not require power usage more than the dynamically determined budget (205).

In the next time period (e.g., $T+\Delta$), the actual power usage is measured, which is typically smaller than the power budget (205). Using the newly measured power usage information and the time window that advances with time for computing the average, the power budget and throttle setting for a further time period can be determined in a similar way.

In one embodiment, the power budget (205) is further limited according to other conditions, such as the limit (201) for instantaneous power usage.

Further, there may be a number of different types of average-based power usages (e.g., with different weight in averaging, based on different power limitation considerations, etc.) Thus, multiple copies of the power budget can be determined from a set of different computations, based on past power usage information; and the lowest power budget can be selected as the limiting budget that determines the throttle setting.

In one embodiment, the measurement is an instantaneous data sample; and the frequency of the data samples are such that the changing history of the power usage is captured in a reasonably accurate way. Alternatively, the measurements may be obtained through an integration process such that even a small number of data samples can represent the power usage history with sufficient accuracy.

Note that the data samples may or may not be collected at the same time interval as that for computing the power budget and throttle setting. In one embodiment, the time period for determining the throttle setting is sufficiently short in comparison with the window (221) to allow flexibility in budgeting and long enough to provide sufficient time for the system to transit from one throttle setting to another when necessary and work reliably in the selected throttle setting.

The time period for determining the throttle setting may or may not be constant. For example, when a significant power usage event occurs (e.g., when the requirement estimate of the non-throttled components changes), the system may automatically start a new computation of the throttle setting.

Figure 3:
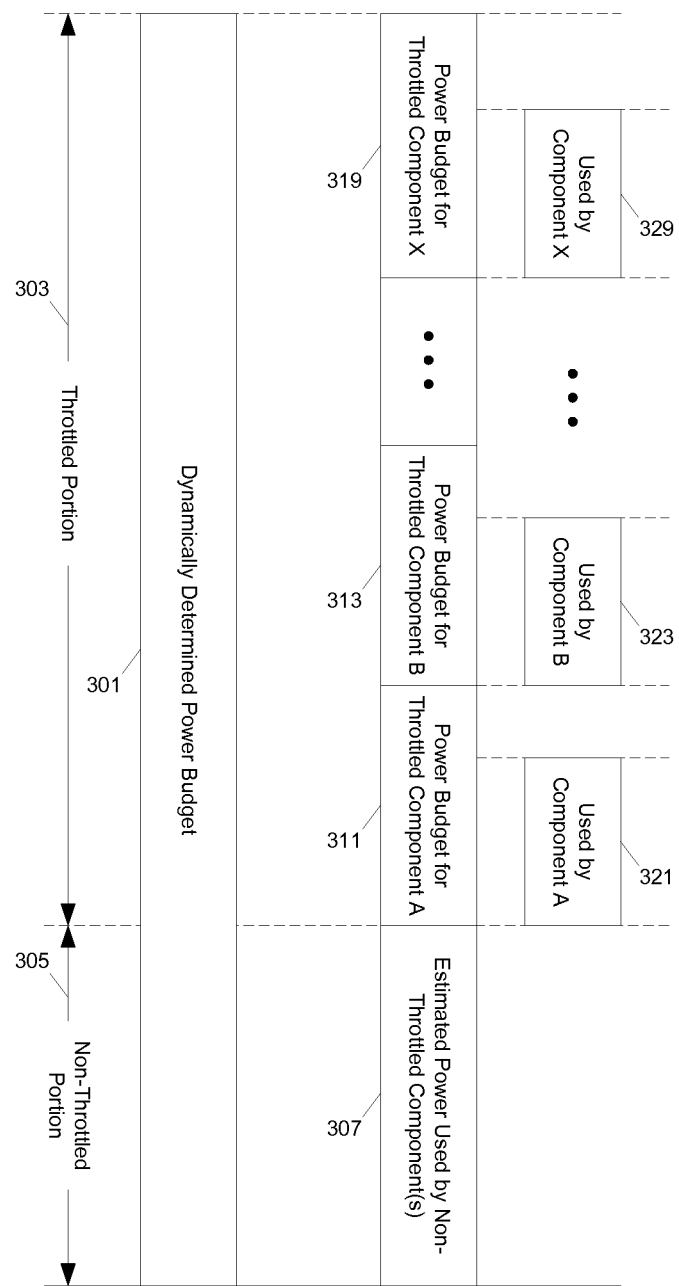
FIG. 3 illustrates a method to dynamically distribute power usage budget according to one embodiment of the present invention.

FIG. 3 illustrates a method to dynamically distribute power usage budget according to one embodiment of the present invention.

In FIG. 3, the dynamically determined power budget (301) is to be allocated to different components (subsystems) of the system.

In one embodiment, the system includes throttled component(s) and non-throttled component(s). A throttled component has different throttle settings at which the component is functional but at different power/performance levels (operating setting). For example, a processor may be throttled to work at different core voltages and core frequencies; a disk drive may be throttled to work at different spin rate; a bus may be throttled at different frequencies; etc. If a component is not throttled to trade performance for power usage, the component is considered a non-throttled component.

In FIG. 3, the power budget (301) includes a throttled portion (303) and a non-throttled portion (305). The non-throttled portion corresponds to the estimated power used by non-throttled component(s) (307). The throttled portion is determined from the difference between the dynamically determined power budget (301) and the estimated power used by the non-throttled component(s).

In general, there can be one or more throttled components. When there are multiple throttled components, the throttle settings determined for the throttled components are such that the sum of the maximum powers (e.g., 311, 313, . . . , 319) that can be used by the corresponding throttled components is no more than the throttled portion of the budget. Thus, the maximum powers (e.g., 311, 313, . . . , 319) that can be used by the corresponding throttled components can be considered as budgets for the throttled components; and the throttle settings ensure that the actual powers (e.g., 321, 323, . . . , 329) used by the throttled components are no more than their dynamically determined budgets (e.g., 311, 313, . . . , 319).

Typically, the components (subsystems) whose throttle is adjusted may not actually consume the entire amount of power that is budgeted, since these components may not be busy enough to run at the maximum power corresponding to the throttle setting. The adjustment of the throttle allows the subsystem the freedom to consume up to the worse case power load for the corresponding throttle setting without violating power constraints.

When a worst-case power load appears, the system quickly notices the need for dynamic power redistribution and sets the throttles to lower values, keeping the system within its operating limits. In general, the power redistribution may be in the form of redistributing among subsystems (components) and/or redistributing over the time for the same subsystem (component) among different performance levels.

Imagine a system with an empty DVD drive that is running a scientific application. The processor and memory subsystems of the system are consuming close to full power, making the whole system run close to its operating limits. Now imagine that a disk is loaded into the DVD drive, which means that the DVD drive is to be enabled, consuming considerable power. In order to actually have power to enable the DVD drive, the system adjusts its power budget so that some of the power which used to be allocated to the processor is now allocated to the DVD drive; the throttle associated with the processor is switched to a lower value.

In one embodiment of the present invention, the averaging interval is (relatively) long with respect to the rate at which the dynamic power redistribution is executed. The allows the system to notice that the system is close to exceeding its limits, and have time to adjust the throttles and ensure that the system does not actually exceed its limits. The typical parts of the system which have power limits (batteries, heat sinks) tend to have fairly long time constants. Thus, it is easy to select a rate at which the dynamic power redistribution is executed.

Although power is referred to as an example of embodiments of the presentation inventions, other parameters related to power can also be managed in a similar way. For example, battery discharge current can be managed in a similar way as power.

In one embodiment of the present invention, a system with dynamic power management according to embodiments of the present invention includes one or more components (subsystems) that can be throttled to have different power requirements at different performance levels and have one or more sensors to actually determine the power consumed.

In one embodiment of the present invention, the past history of actual power consumption is used to dynamically determine the power usage budget for the subsequent time interval, such that even if the worst-case load occurs in the subsequent time interval the power usage constraint (e.g., average power usage, or average battery discharge current) is not violated.

In one embodiment of the present invention, the actual power consumed by each subsystem is determined for the dynamic power redistribution and throttling.

In one embodiment of the present invention, instead of determining the actual power consumption by each subsystem, the sum of the power consumed by the throttled subsystems and the sum of the power consumed by the non-throttled subsystems are determined and used for the throttling.

Figure 4:
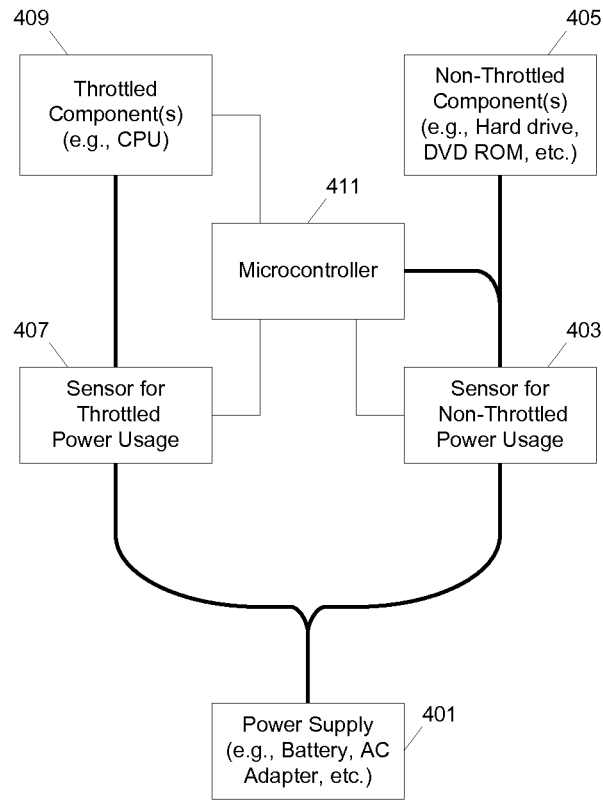
FIG. 4 illustrates a block diagram example of a system to dynamically control power usage according to one embodiment of the present invention.

FIG. 4 illustrates a block diagram example of a system to dynamically control power usage according to one embodiment of the present invention.

In FIG. 4, a microcontroller (411) is used to budget the power usage dynamically. The power supply (401) (e.g., battery, AC adapter, etc.) provides power to the throttled component(s) (409) (e.g., CPU) and the non-throttled component(s) (405) (e.g., hard drive, DVD ROM, etc.). The microcontroller (411) can be considered as part of the non-throttled components. Alternatively, the microcontroller (411) may draw power from a power supply different from the power supply (401). Sensors (407 and 403) are used to determine the actual power usages by the throttled component(s) (409) and the non-throttled component(s). The microcontroller (411) collects the actual power usage information from sensors (407 and 403) and communicates with throttled components (409) to make throttle changes.

In embodiment, a single sensor or measuring device may be used to measure power drawn by several non-throttled devices (rather than having one sensor for each non-throttled device). For example, wires may be arranged to connect to several non-throttled devices; and the measured power is that consumed by all of the non-throttled devices connected. A sensor can be used to determine the sum of the power consumed by the system directly (e.g., using a single current sensor at a location where the current drawn by the throttled components and the current drawn by the non-throttled components merges) and to determine the dynamic throttle setting.

Alternatively, this approach may be implemented by, for example, coupling the single sensor to wires from each of the several non-throttled devices, and the measured currents and/or voltages are summed in the sensor. Alternatively, multiple sensors can be used; and the microcontroller (or the microprocessor) sums the measurements from the sensors.

For example, the microcontroller may store the determined throttle setting in a register and then send a signal to the corresponding component (or the main CPU) to enforce the throttle setting. In one embodiment, the microcontroller sends the signal to enforce the throttle change only when the dynamically determined throttle setting is different from the previous one.

In one embodiment, the sensors are implemented using hardware. Alternatively, at least some of the sensors can be implemented using software. For example, software modules may be used to determine the operation states and corresponding time periods to compute the actual power usage from predetermined power consumption rate for the operation states.

Figure 5:
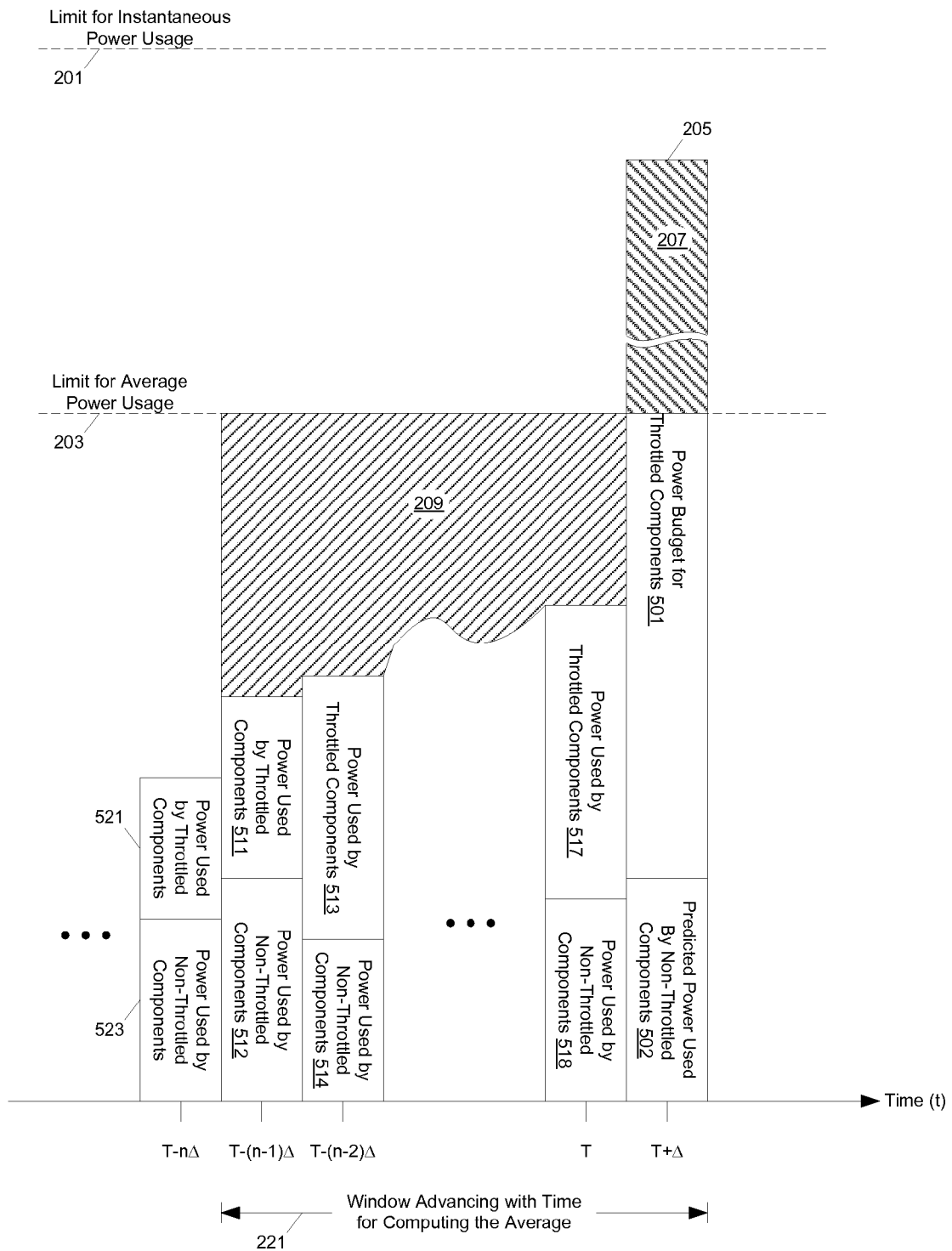
FIG. 5 illustrates an example of dynamically throttling components of a data processing system to control power usage according to one embodiment of the present invention.

FIG. 5 illustrates an example of dynamically throttling components of a data processing system to control power usage according to one embodiment of the present invention.

In FIG. 5, the actual power usages include the power used by the throttled components (e.g., 521, 511, 513, . . . 517) and the power used by the non-throttled components (e.g., 523, 512, 514, . . . 518).

In one embodiment, the power used by the non-throttled components at the subsequent time interval (e.g., $T+\Delta$) is determined using the worst-case power load of the non-throttled component. Alternatively, the non-throttled components may be interrogated to obtain the worst-case power load of the non-throttled component according to their current operating status.

Alternatively, operating signals of at least some of the non-throttled components can be used to classify the corresponding non-throttled components into a global operating state, which is used to obtain an estimate that corresponds to the global operating state.

In one embodiment, the raw sensor measurements are used directly by a microcontroller or a microprocessor to perform dynamic power budgeting. Alternatively, the raw sensor measurements may be further processed using hardwire (e.g., using analog or digital circuitry) to generate data that is used by the microcontroller or microprocessor to perform dynamic power budgeting. Thus, there may be a layer of algebra between the raw sensors and the throttled and non-throttled powers.

In one embodiment, dynamic power redistribution is performed frequently and periodically. For example, the dynamically determined throttle setting can be determined periodically at a predetermined time interval. However, it is understood that the time interval is not necessarily a constant. For simplicity, some examples with a constant time interval are used to illustrate the methods according to embodiments of the present invention.

In one embodiment of the present invention, the setting for a throttle is computed for the next time interval to guarantee that the average power over the last N time intervals, including the next time interval, is less than a power constraint $P_{MAX}$. Thus, when the measured power data from the last N−1 time intervals is combined with the hypothetical worst-case power data of 1 sample for the next time interval, the average power is no more than $P_{MAX}$.

In general, the averaging process of the power usage over the last N time intervals can be a simple average, or a weighted average (e.g., weighted according to the elapsed time with decreasing weight for away back into the past), or other complex functions of the power usage history.

For example, let $P_T[N-1:1]$ be an array containing the measured power data of the throttled parts of the system for the last N−1 time interval. Let $P_N[N-1:1]$ be an array containing the measured power data of the non-throttled parts of the system. To determine the throttle for the next time interval:

1) update the array containing the measured power data of the throttled parts of the system. For example, $P_T[N-2:1]$ can be copied (e.g., through shifting) into $P_T[N'1:2]$; and a new measurement of the sum of the power data of the throttled part of the system is stored into $P_T[1]$. The oldest sample, which was in $P_T[N-1]$, is discarded.

2) similarly, update the array containing the measured power data of the non-throttled parts of the system. For example, $P_N[N-2:1]$ can be copied (e.g., through shifting) into $P_N[N-1:2]$; and a new measurement of the sum of the power data of the non-throttled part of the system is stored into $P_N[1]$. The oldest sample, which was in $P_N[N-1]$, is discarded.

3) compute EPN, which is an estimate of average value of the non-throttled power over the last N samples, from the average of the N−1 power measurements in PN[N−1:1] and one estimate of the maximum power PN[0] which may be consumed by the non-throttled parts of the system.

4) for ith throttle setting, computer ETN[i], which is an estimate of the average value of the throttled power over the last N samples, from the average of the N−1 power measurements in PT[N−1:1] and the estimate of the maximum power PT[0, i] which may be consumed by the throttled parts of the system at throttle setting i.

5) determine the highest throttle setting im for which EPN ETN[im] is less than or equal to PMAX. Thus, when throttle setting im is used, the average power through the next time interval will be less than or equal to the maximum power allowed by the system.

Note that in general, any throttle setting ix for which EPN ETN[ix] is less than or equal to PMAX can be selected without exceeding the limit PMAX. In one embodiment, the throttle settings are arranged according to performance level. The higher the throttle setting, the higher the performance. Thus, the highest throttle setting that limit the power usage according to PMAX is selected to allow the highest performance under the power constraint.

Figure 6:
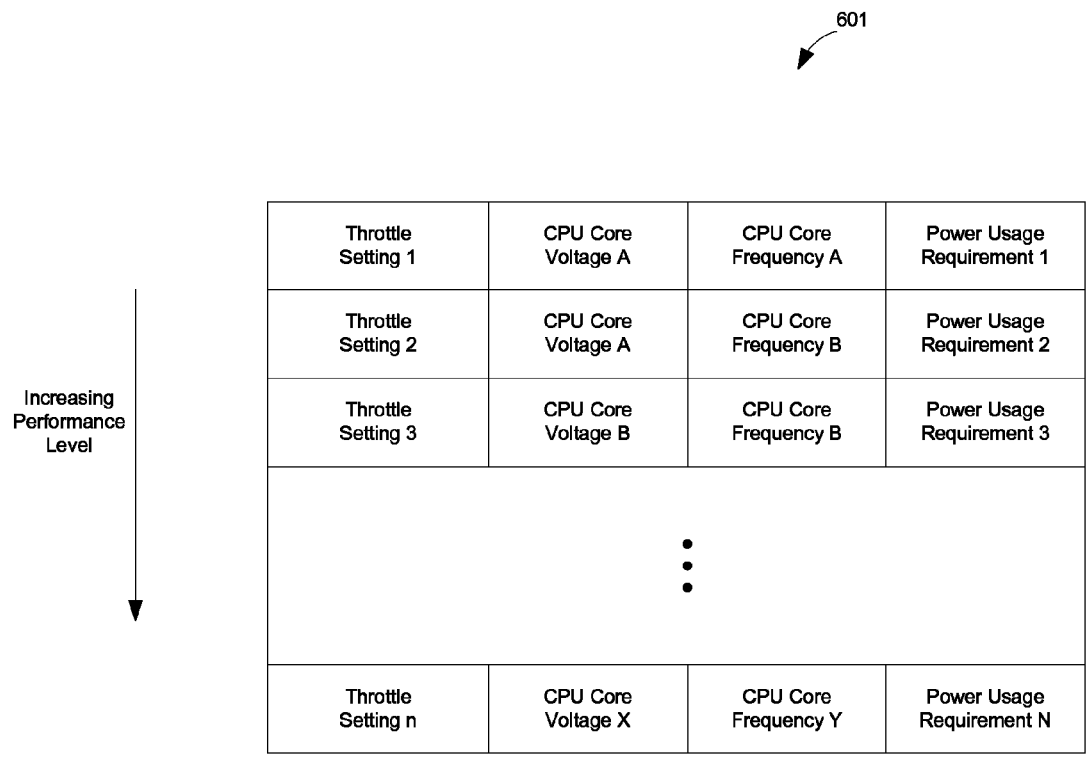
FIG. 6 illustrates an example of using throttle settings of a central processing unit (CPU) of a data processing system to control power usage according to one embodiment of the present invention.

FIG. 6 illustrates an example of using throttle settings of a central processing unit (CPU) of a data processing system to control power usage according to one embodiment of the present invention.

In FIG. 6, a number of different combinations of CPU core voltages and core frequencies are sorted so that the throttle setting increases with the performance level, as illustrated in table 601. In one embodiment, the system searches in the order of decreasing throttle setting to determine the first throttle setting that satisfies the relation EPN ETN[ix] PMAX.

Thus, when a throttle setting is determined, both the CPU core voltages and frequencies are determined.

Alternatively, the throttles may be sorted according to other goals (e.g., a combined goal indicator to reflect the requirement for high computing power and low energy consumption, etc.); and a "best" throttle setting can be searched in a similar way.

Note that if there are multiple independent throttles, a list of different combination of throttles can be examined to determine the allowable throttle settings. A "best" setting of the throttles can be selected according to certain rules that define the objective "best". It is understood that the rules for define the objective can be arbitrarily complex.

Figure 7:
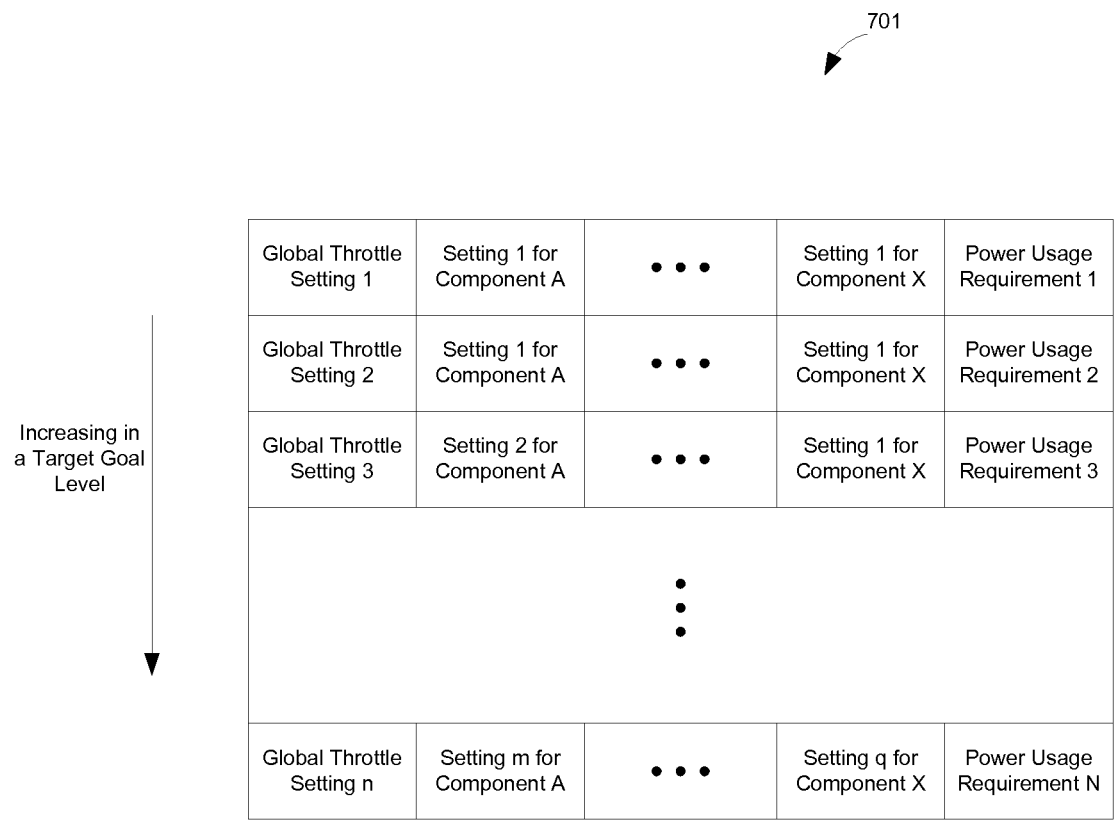
FIG. 7 illustrates an example of using throttle settings of multiple components of a data processing system to control power usage according to one embodiment of the present invention.

FIG. 7 illustrates an example of using throttle settings of multiple components of a data processing system to control power usage according to one embodiment of the present invention.

In FIG. 7, multiple components have independent throttle settings, as illustrated in table 701. To distribute the dynamically determined budget to the multiple components, different combinations of the throttle settings for the multiple components can be viewed as different global throttle settings. The global throttle settings can be sorted according to a target goal level.

In one embodiment, the sorting of the global settings can be performed at the design stage of the computer according to a static fixed target goal function, or manually arranged by the designer of the system.

Alternatively, the global settings can be performed in real time according to a target goal function, which may be a function of current state of the computer system. For example, some of the components may be busy so that require higher priority while others may be in idle and require lower priority. Thus, the target function can be constructed to include the consideration of the current workloads of the components. The workloads can be estimated from the history of the actual power consumptions. For example, the high power consumption with respect to the dynamic power range of the component indicates a high workload for the component.

Once the global settings are sorted according to the target goal level, the highest global setting that satisfies the power constraint is selected.

Figure 8:
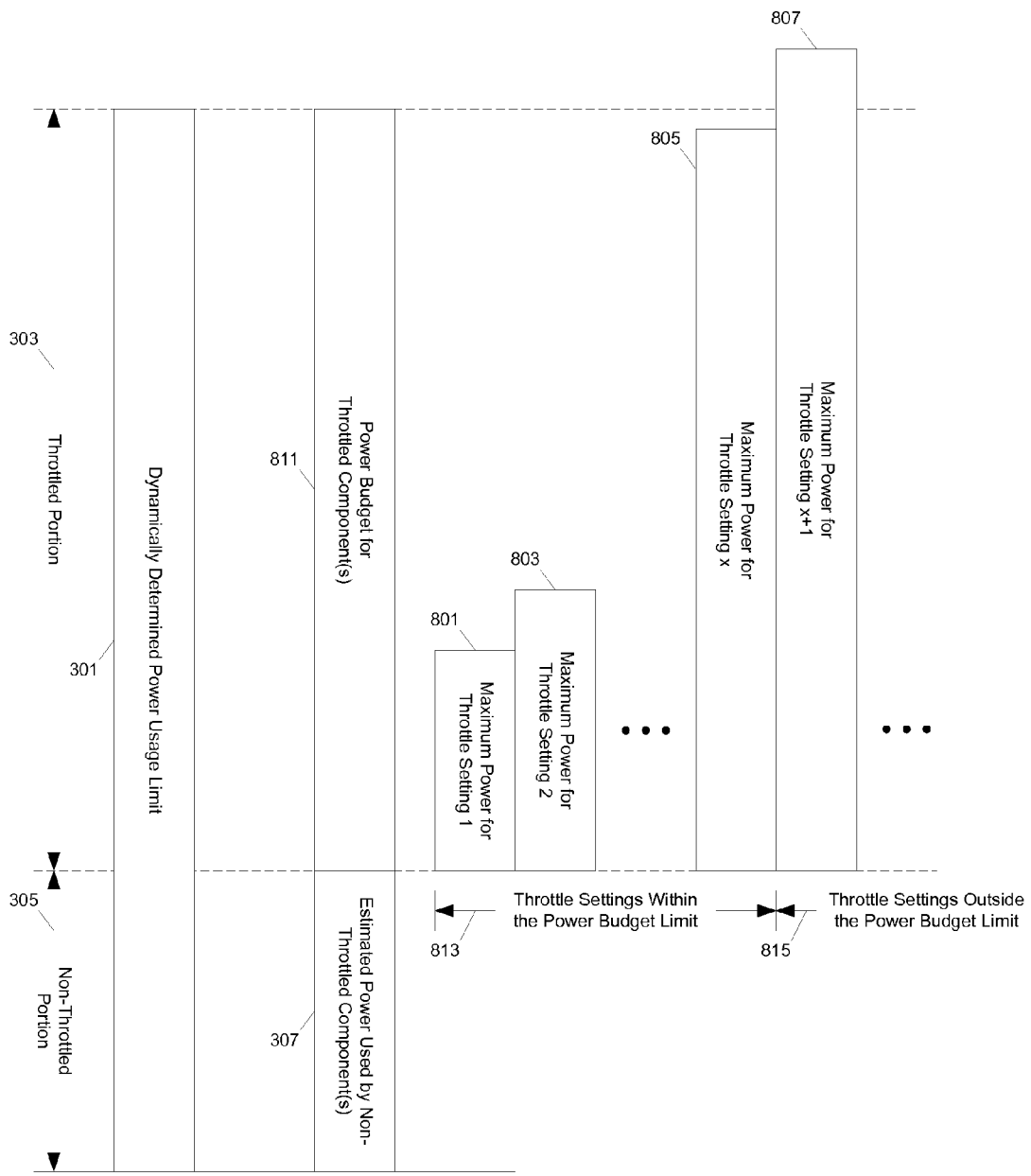
FIG. 8 shows a method to dynamically determine throttle setting according to one embodiment of the present invention.

FIG. 8 shows a method to dynamically determine throttle setting according to one embodiment of the present invention.

In FIG. 8, the throttle settings are sorted according to the power requirements. Since the power requirements are typically known at the design stage, the sorting can be performed once during the design of the system.

The dynamically determined power usage limit (301) is partitioned into the non-throttled portion (305) and the throttled portion (303). The non-throttled portion (305) corresponds to the estimated power (307) used by the non-throttled components in the subsequent time interval.

The power budget (811) for the throttled components can then be used to determine the set of throttle settings (813) that are within the power budget limit (e.g., 801, 803, . . . , 805). The throttle settings that are outside the power budget limit (815) will be excluded from consideration for the next time interval (e.g., 807).

The system then can select one from the allowable set of throttle settings (813) to optimize a performance goal.

In one embodiment, when the previous actual power usage is low, the power budget (811) for the throttled component(s) can be sufficient enough to allow all throttle settings.

Typically, a selected throttle setting is used until the power measurement for the next time interval is obtained and the next iteration of dynamic throttling is performed.

Alternatively, the throttle setting may be determined on a substantially continuous basis; and the power management system requests throttle setting changes whennecessary. To avoid frequent changes in throttle settings, the power management system may determine the throttle setting so that the throttle setting will be valid for at least a predetermined period of time unless a significant change in the estimate of the power used by the non-throttled components is detected (e.g., when a disk is loaded into the DVD ROM drive).

In one embodiment of the present invention, the power management monitors the actual power usage and adjusts the throttling to avoid the violation of power constraints.

Figure 9:
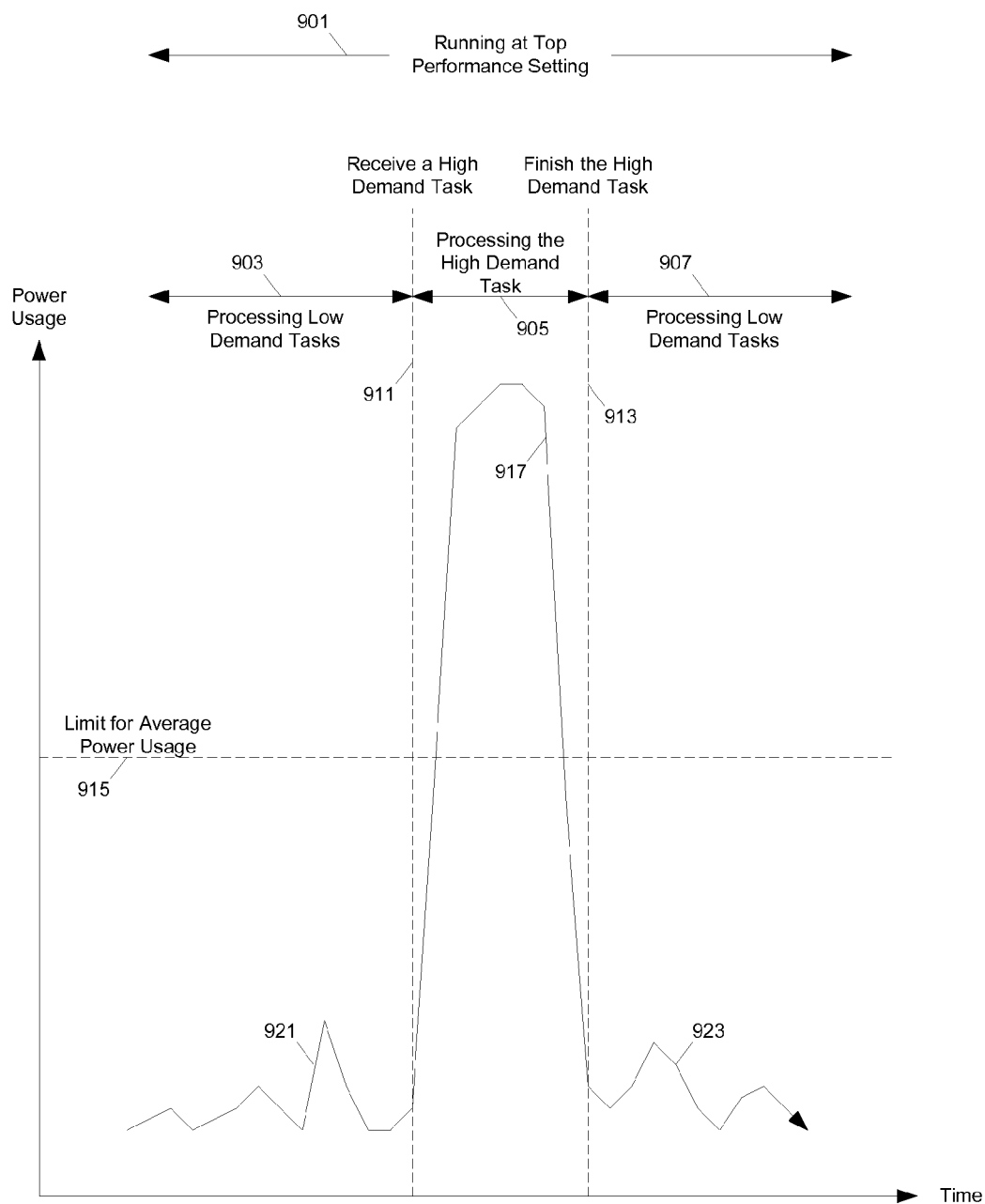
FIGS. 9-10 illustrate scenarios of power usage according to embodiments of the present invention.
Figure 10:
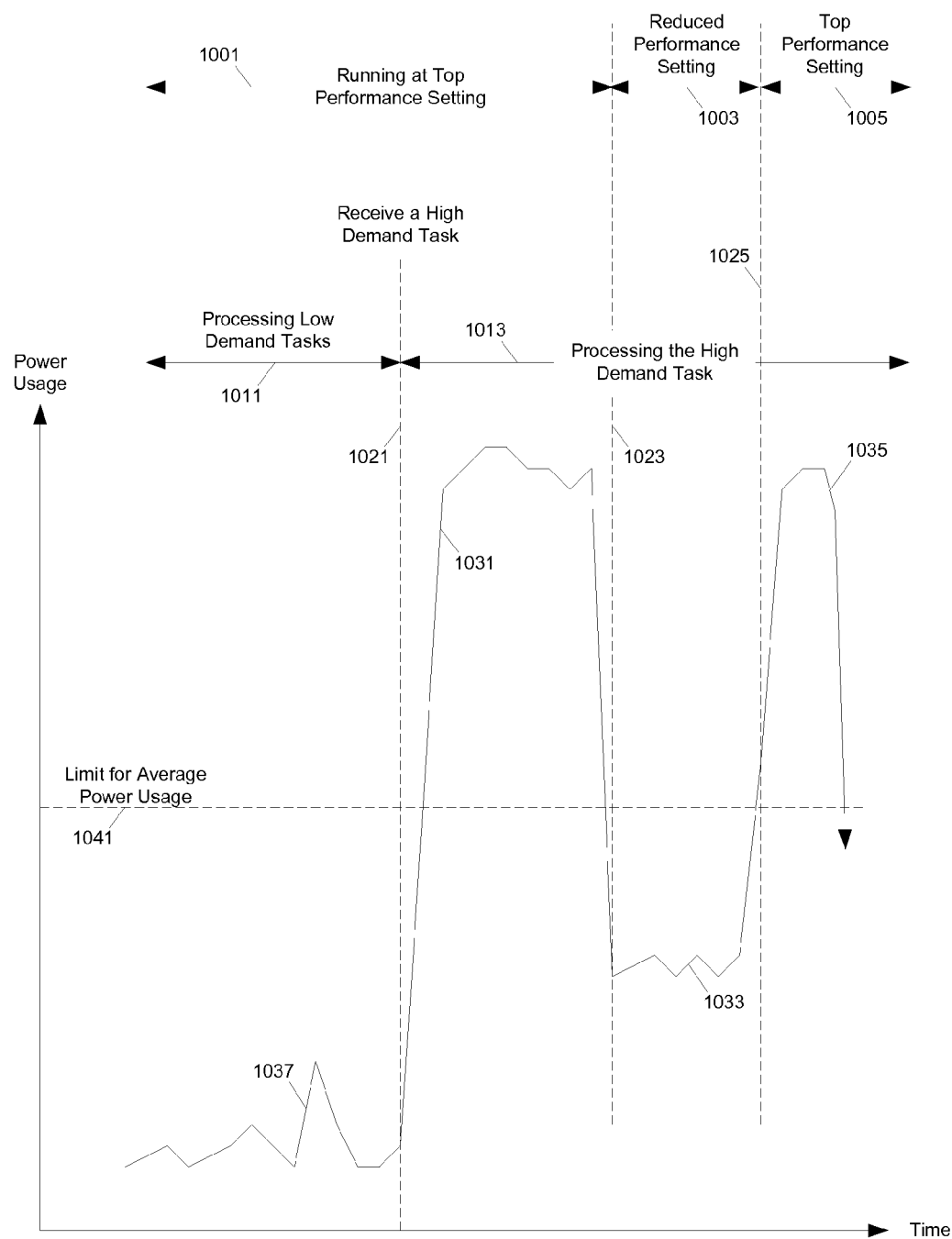

FIGS. 9-10 illustrate scenarios of power usage according to embodiments of the present invention.

In the scenario of FIG. 9, the computer system processes (903) low demand tasks before time instance (911); and the actual power (921) used by the system is below the limit (915) for average power usage. Since the power usage of the system is low, the system can be at the top performance setting (901).

After time instance (911), a high demand task is received. The system becomes busy in processing (905) the high demand task. Since the system had low power consumption before the reception of the high demand task, the power management allows the system to remain in the top performance setting for a short period of time. Thus, the actual power usage (917) increases to above the limit for average power usage. However, in average, the actual power usage is still below the limit.

After the high demand task is finished at time instance (913), the actual power usage (923) comes back to below the limit (915) for average power usage. Thus, the system can remain (901) in the top performance setting to process (907) low demand tasks.

The usage pattern as illustrated in FIG. 9 can be a typical one for certain usages of the system. Thus, the system can be designed on a tight power constraint while capable of running at top performance setting as if it were designed according to a worst-case load which would require a much higher power capacity.

However, the high demand task can be such that it may take a long period of time to finish the task. If the system were allowed to be in the top performance setting for a long period of time, the limit (915) for average power usage would be violated. A system according to embodiment of the present invention can automatically detect such situations and throttles accordingly to avoid exceeding the limit.

For example, in FIG. 10, before time instance (1021) of receiving a high demand task, the system processes (1011) low demand tasks, as indicated by the low actual power usage (1037).

After the time instance (1021), the system processes (1013) the high demand task for a period of time.

Initially, the system remains in the top performance setting, which causes the actual power usage to be above the limit (1041) for average power usage. At the time instance (1023), the power management recognizes that the average of the actual power usage in the past period is approaching the limit (1041); and the system throttles into a reduced performance setting (1003).

At the reduced performance setting, the actual power consumption (1033) is below the limit (1041) for average power usage. Thus, at time instance (1025), the average power usage in the past may fall below the limit (1041) enough to allow the system to temporary back to the top performance setting (1005).

When the processing of the high demand task lasts for a long period of time, the system automatically switches between the top performance setting and the reduced performance setting periodically to have a long term average that is close to the limit (1041) for the average power usage.

Thus, under the control of the dynamic throttling system, the system processes the high demand task as fast as possible within the limit of power constraint.

In one embodiment of the present invention, multiple copies of throttle settings can be determined based on different constraints, for example, one for each boundary condition of power. The lowest one of the multiple copies of throttle settings is then used to ensure that the all constraints are satisfied. Typically, the performance is set by the subsystem which is most constrained.

The estimate of the maximum power which may be consumed by the non-throttled subsystems can be computed by a simple worst-case analysis (adding together the maximum values which could happen under any conditions) or by a more elaborate analysis based on the information provided by the subsystems and detailed knowledge of the subsystem's state.

The dynamic throttle setting determination can be performed in a variety of components in the computer system, including the main processor of the computer system, or a microcontroller dedicated to the dynamic power throttling task.

There are advantages to execute the dynamic budgeting in the main processor, such as reduced cost, and the elimination of any need to communicate between the main processor and whatever other agent that is alternatively used to perform the task. However, it is difficult to make an arrangement such that dynamic power management operates in all situations, including when the software in the main processor fails or is replaced with some other software which has no knowledge of the power management algorithm. Further, when the computer system is in an otherwise idling state, the periodic power management task may prevent the system from entering a low power state, or may periodically wake the system from the low power state.

When the ability to load throttle settings is reserved to the main processor of the computer system and the dynamic power throttle determination is not performed in the main processor, making the computed throttle setting the current throttle setting may become complicated. The throttle settings need to be communicated to the main processor; and in some situations, it may be necessary to implement fail-safe mechanisms to deal with the (unlikely) case that the software running in the main processor ignores the command to load the throttles. The fail-safe mechanisms can be fairly crude, since they should only be engaged in emergency situations. For example, when the microcontroller determines that the average of the past N samples exceeds the power limit PMAX for a number of continuous time intervals, the microcontroller may assume that the throttling settings are not enforced properly and automatically initiate a shutdown process.

In one embodiment, the estimation of the power usage is obtained from adding together the maximum powers which could be consumed by the non-throttled subsystems (components). Such an estimate can be done when the system is designed; and the result can be a constant. However, such an estimate is extraordinarily conservative, which may unnecessarily cause the system to force a throttled subsystem (component) into a low performance setting.

In one embodiment, the main processor performs a fairly detailed power analysis based on the characteristics of the subsystems and the current state of the subsystems. The analysis result is then used to determine the maximum power the non-throttled subsystems can consume at the current state of the operating conditions of the subsystems.

For example, the main processor may look at all of the system's USB (Universal Serial Bus) ports, and, if a device is actually plugged into the port, extract the descriptor from the device which reports the device's power consumption, and use the information from the descriptor in the power analysis.

Such a detailed analysis can result in best possible estimate. However, such a detailed analysis may require non-trivial changes to software running on the main processor to provide the power consumption information.

In one embodiment of the present invention, the signals used for normal operation of a subsystem (component) are used to determine the global state of the subsystem (component). The power requirement for the current global state is then used to determine the power requirement of the subsystem. Such an approach can generally improve the estimation of the power requirement of non-throttled components of the system without taking on the complexity of a detailed analysis, or making non-trivial changes to the software.

In one embodiment of the present invention, it is observed that many, if not most, of the non-throttled subsystems operate in one or more global states, and those states can be distinguished by looking at signals already necessary for the operation of the subsystem.

For example, a USB port is either in the empty state (where it consumes no power) or the in-use state (where is can consume as much as 2.5 W of power). These states are easily distinguished by looking at the enable signal on the USB power switch.

A USB port has a power switch which is enabled by software when a device is plugged in, and disabled by software when the device is unplugged. The power management can look at the digital enable for the power switch to learn if the connector is empty or full, which lets it decide if it should use 0.0 W or 2.5 W in the calculation.

Alternatively, a crude power measurement for the USB port can be used to determine whether or not the USB port is in the 0.0 W mode. Such a power measurement approached can be used in a system which does not enable/disable the switches.

Ports for an IEEE-1394 serial bus is like USB, except that the device connected to the IEEE-1394 port can draw more power than a USB device. In one embodiment, when the IEEE-1394 port is on, the power management budgets 8 W for the device.

A crude measurement of the disk drive current can tell if the disk is spinning or not (it can tell sleep state from idle state). If the disk is spinning, the maximum power that can be consumed by the disk drive is, for example, 2.5 W (e.g., for read/write access). If the disk is not spinning, it might be told to spin up, so the maximum power that can be consumed power is, for example, 5.0 W for a brief instant (e.g., for spin-up).

For example, a display backlight operates at a number of brightness levels, each with different power consumption; and these brightness levels are easily distinguished by looking at the PWM (Pulse-Width Modulation) control signal running between the display controller and the backlight power supply. A measurement of the duty factor of the PWM signal which runs between the graphics chip and the backlight inverter can be used to estimate the power consumed by the backlight. For example, a very dim backlight is less than a watt; and a full brightness backlight is close to 6 watts. Thus, improvement on the estimation of power used by the display backlight can significantly improve the estimation of power consumption by the non-throttled components.

For example, the PRSNT1#/PRSNT2# pin signals on the PCI (Peripheral Component Interconnect) slot (or similar pin signals from other interconnect slots, such as a PCI Express slot) could be used to estimate the power which might be consumed by the device plugged into the slot and to determine if a slot is empty.

In one embodiment, improved non-throttled power estimation is obtained from bringing the signals which allow the global power states to be distinguished to the agent (e.g., the microcontroller or the main processor) which actually needs the estimate. The power of any subsystem for which no state signal is available to determine the global states is assumed to need maximum power that could be consumed by the subsystem, but the power for any subsystem for which a state signal is available is assumed to be the maximum power in its current state.

Thus, no additional software modules are required to be running on the main processor for the purpose of reporting power requirements other than the software needed to actually run the device. Although the estimate it computes is no better than a worst case estimate in situations where all of the non-throttled subsystems are busy, it provides a considerably better than worst-case estimate in situations where some of the non-throttled subsystems are running at less than worst case. The inventors know that this is a very common case in normal operation. Thus, the approach of using the existing operating signals in the estimation can provide a better estimate for typically usages.

Figure 11:
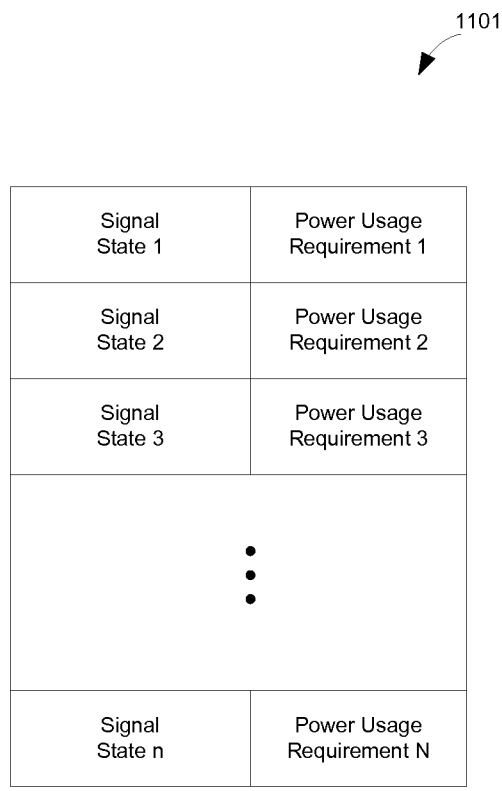
FIG. 11 illustrates a table to look up the power usage requirement of the non-throttled component based on signal states according to one embodiment of the present invention.

FIG. 11 illustrates a table (1101) to look up the power usage requirement of the non-throttled component based on signal states according to one embodiment of the present invention. In one embodiment, the states of the signals are based on the existing signals are designed for the normal operations of the device. Thus, no special design or software module is necessary to obtain the power usage information from the device.

Figure 12:
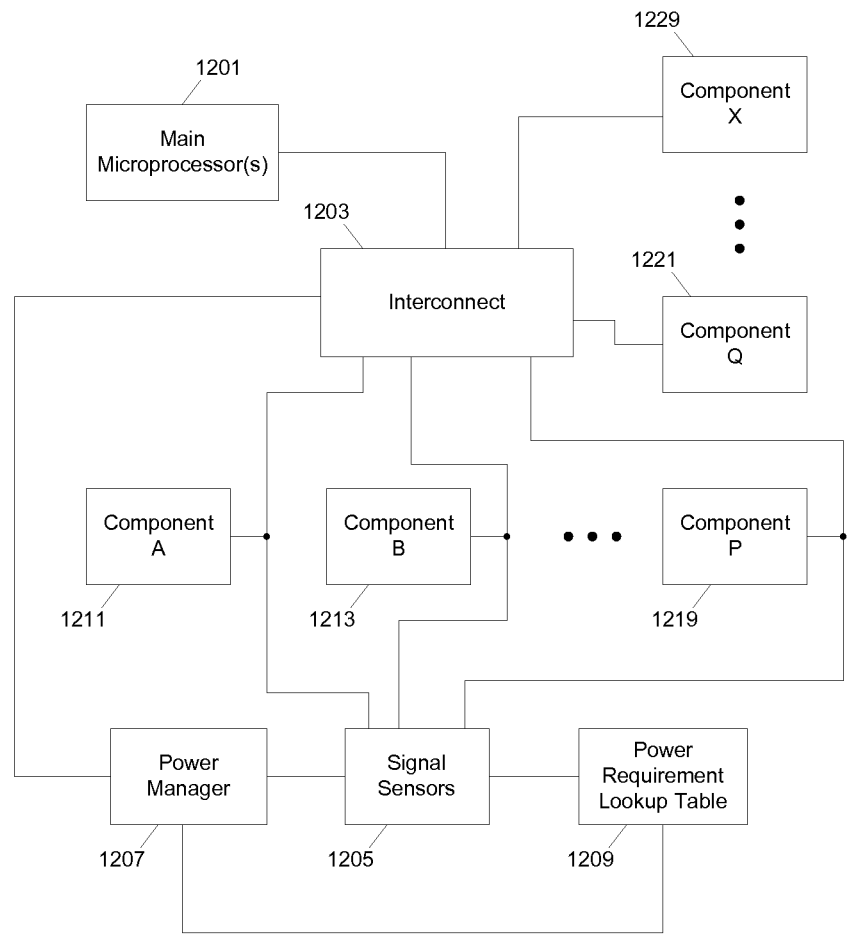
FIG. 12 illustrates a computer system with a power management system according to one embodiment of the present invention.

FIG. 12 illustrates a computer system with a power management system according to one embodiment of the present invention.

In FIG. 12, interconnect (1203) connects various components (e.g., 1211, 1213, . . . , 1219, 1221, . . . , 1229) with the main microprocessor(s) (1201).

In FIG. 12, the power manager (1207) (e.g., implemented as a microcontroller) is used to dynamically determine the throttle settings of the system to balance the performance requirement and the power usage limit.

Signal sensors (1205) are used to monitor selected operating signals from some of the components (e.g., 1211, 1213, . . . , 1219). These operating signals are used by the components (1211, 1213, . . . , 1219) even without the use of the power manager. The signal sensors (1205) tap into these signals to look up estimated power requirements for the components from lookup table (1209). A typical tapped signal can be used to classify the state of the component into one of a plurality of possible states. When operating in some of the states, the component consume less than the maximum possible power. Thus, the signals can be used to look up more accurate power requirements according to the operation condition of the components. Further, one of the sensors in the signal sensors (1205) may be measuring the power levels of one or several different components.

When a component does not have a signal tapped to obtain a better estimation, a conservative estimate based on the maximum possible power used by the component is used. The power manager adds the power requirement for the components (e.g., 1211, 1213, . . . , 1219, 1221, . . . , 1229) to obtain an estimate of power that may be used in the subsequent time interval.

In one embodiment, based on the power requirement for these components and the past power usage history, the power manager (1207) further determines a throttle setting for the main microprocessor(s) (1201) so that the power usage within the next time period will be within the limit of a power constraint even when the main microprocessor(s) are fully busy in the next time period.

In one embodiment, the power manager is partially or entirely implemented as a software module running on the main microprocessor(s) (1201). The lookup table (1209) can also be implemented using a software module using a random access memory of the computer system or using a dedicated hardware module.

FIGS. 13-16 illustrate methods of power management according to embodiments of the present invention.

Figure 13:
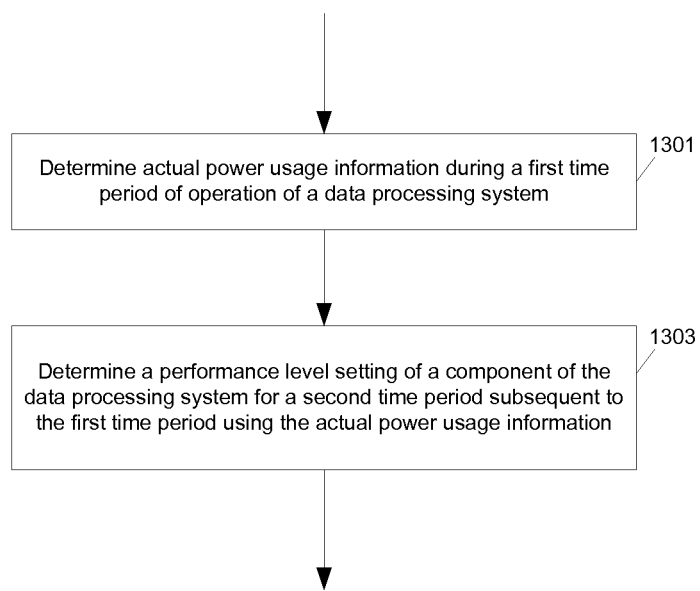
FIGS. 13-16 illustrate methods of power management according to embodiments of the present invention.

In FIG. 13, operation 1301 determines actual power usage information during a first time period of operation of a data processing system. The actual power usage information can be in the form of measurement of power, or current (e.g., at a known voltage), or power averaged in time, or current averaged in time, or measurements of other quantities that are indicative of actual power usage. Operation 1303 determines a performance level setting of a component of the data processing system for a second time period subsequent to the first time period using the actual power usage information. The system is set to the determined performance level setting to ensure that the power usage of the system operating at the determined performance level setting in the second time period will not exceed any limit.

Figure 14:
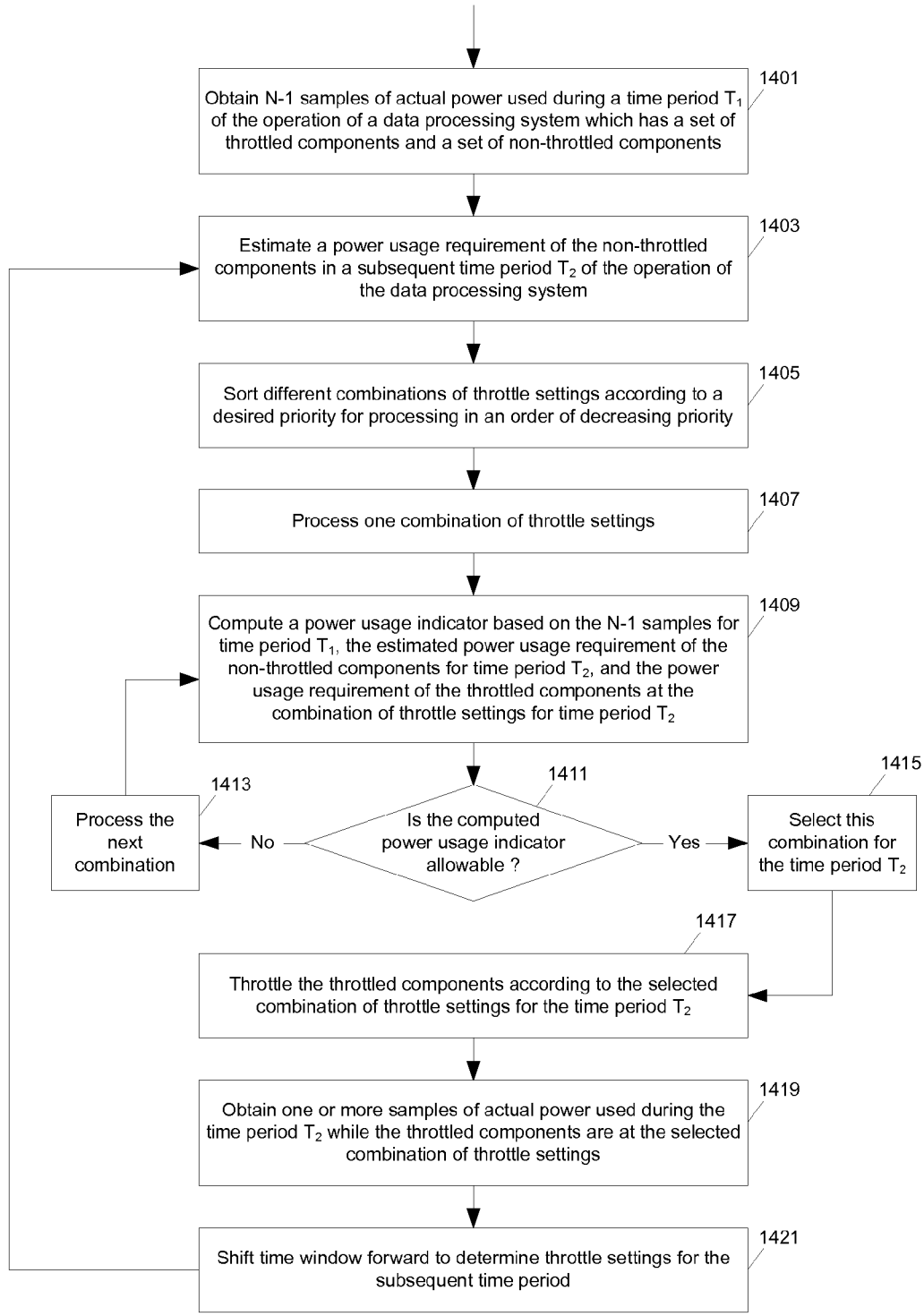

In FIG. 14, operation 1401 obtains N1 samples of actual power used during a time period T1 of the operation of a data processing system which has a set of throttled components and a set of non-throttled components. In one embodiment, throttled components have different adjustable performance level settings that have different power usage requirements; and non-throttled components are not actively managed/controlled to trade performance level for power usage.

Operation 1403 estimates a power usage requirement of the non-throttled components in a subsequent time period T2 of the operation of the data processing system.

Operation 1405 sorts different combinations of throttle settings according to a desired priority for processing in an order of decreasing priority. In one embodiment, the priorities of the throttle settings depend on the current workload of the different throttled components; and the sorting is performed in real time. In one embodiment, the priorities of the throttle settings are designed to be independent from the current workload of the different throttled components; and the sorting can be performed only once during the design or installation phase.

Operation 1407 processes one combination of throttle settings. Operation 1409 computes a power usage indicator based on the N1 samples for time period T1, the estimated power usage requirement of the non-throttled components for time period T2, and the power usage requirement of the throttled components at the combination of throttle settings for time period T2. For example, the power usage indicator can be an average power usage, an average battery discharge current, an average heat generation, etc.

If operation 1411 determines the computed power usage indicator is not allowable, operation 1413 processes the next combination; and operation 1409 is repeated, until operation 1411 determines the computed power usage indicator is allowable. In one embodiment, the settings are defined (e.g., by design) so that at least one combination is always allowable; thus, the loop of operations 1409, 1411 and 1413 eventually exits to operation 1415.

When the computed power usage indicator is allowable for a combination of throttle settings, operation 1415 selects this combination for the time period T2. Operation 1417 throttles the throttled components according to the selected combination of throttle settings for the time period T2.

Operation 1419 obtains one or more samples of actual power used during the time period T2 while the throttled components are at the selected combination of throttle settings. Operation 1421 shifts time window forward to determine throttle settings for the subsequent time period. Thus, operations 1403 through 1421 can be repeated for the subsequent time period.

Figure 15:
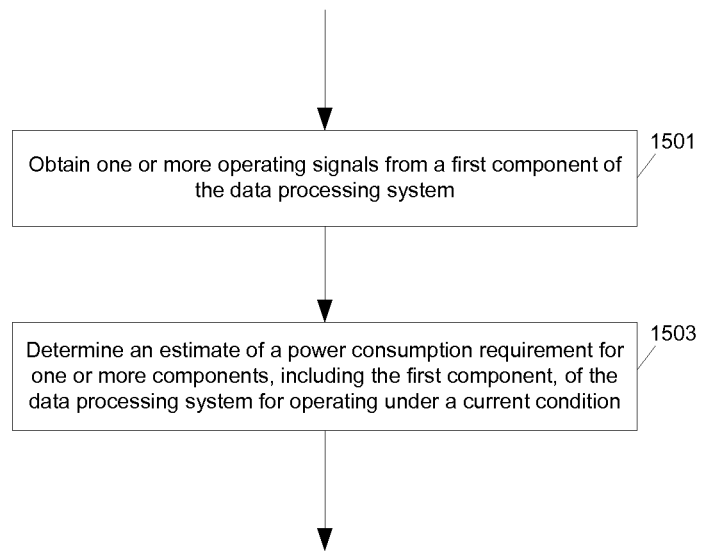

In FIG. 15, operation 1501 obtains one or more operating signals from a first component of the data processing system. In one embodiment, the operation signals are present for the normal operations of the components regardless whether or not the components are under power budget control according to embodiments of the present invention. Such an arrangement can minimize the impact of implementing methods of embodiments of the present invention on the design of the non-throttled components. Alternatively, the non-throttled components may be specifically designed to provide signals to dynamically indicate their power usage requirements.

Operation 1503 determines an estimate of a power consumption requirement for one or more components, including the first component, of the data processing system for operating under a current condition.

Figure 16:
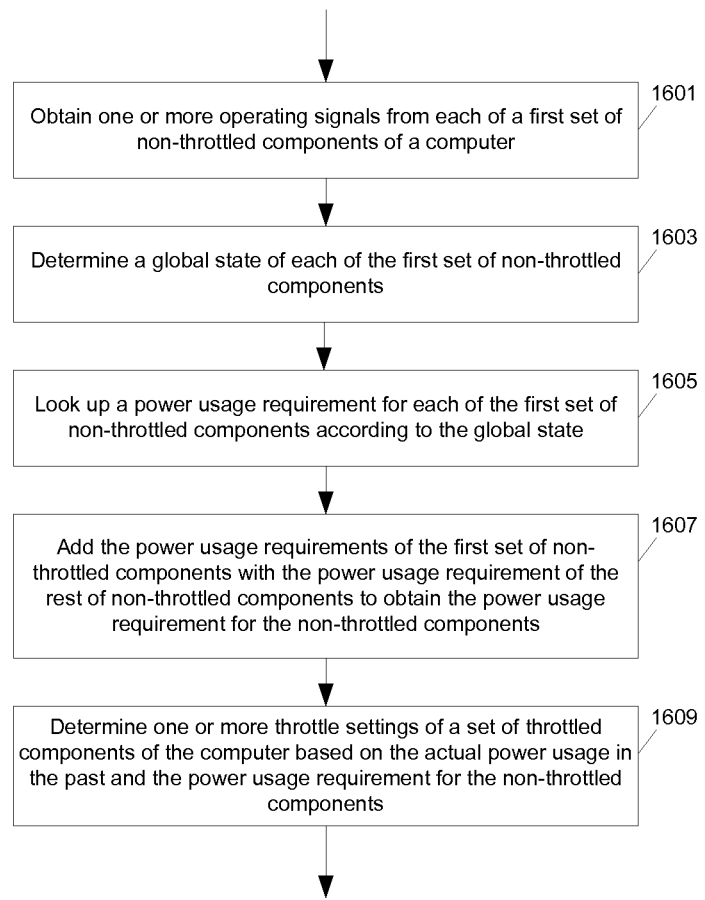

In FIG. 16, operation 1601 obtains one or more operating signals from each of a first set of non-throttled components of a computer. Operation 1603 determines the global state of each of the first set of non-throttled components. Operation 1605 looks up a power usage requirement for each of the first set of non-throttled components according to the global state. Operation 1607 adds the power usage requirements of the first set of non-throttled components with the power usage requirement of the rest of non-throttled components to obtain the power usage requirement for the non-throttled components. Operation 1609 determines one or more throttle settings of a set of throttled components of the computer based on the actual power usage in the past and the power usage requirement for the non-throttled components.

Many of the methods of the present invention may be performed with a digital processing system, such as a conventional, general-purpose computer system. Special purpose computers, which are designed or programmed to perform only one function, may also be used.

Figure 17:
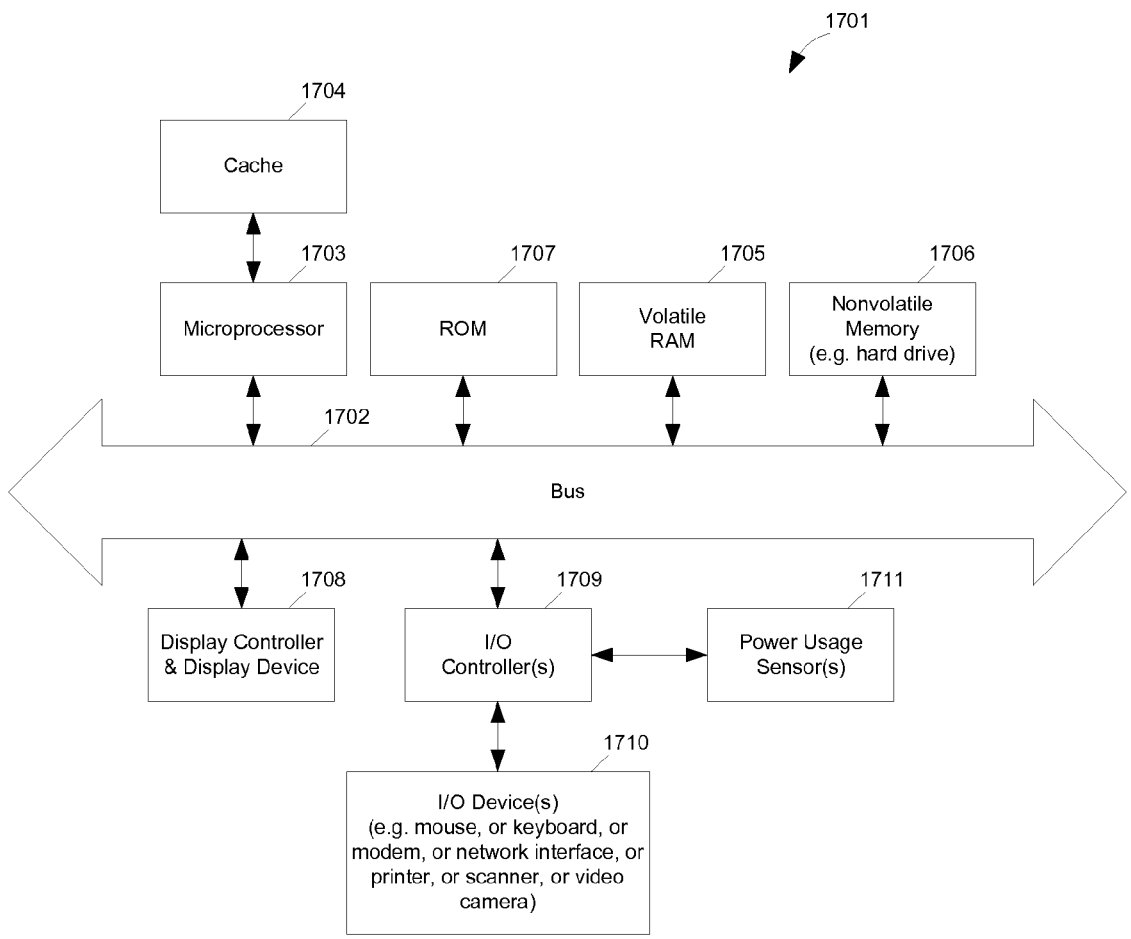
FIG. 17 shows a block diagram example of a data processing system which may be used with the present invention.

FIG. 17 shows one example of a typical computer system which may be used with the present invention. Note that while FIG. 17 illustrates various components of a computer system, it is not intended to represent any particular architecture or manner of interconnecting the components as such details are not germane to the present invention. It will also be appreciated that network computers and other data processing systems which have fewer components or perhaps more components may also be used with the present invention. The computer system of FIG. 17 may, for example, be an Apple Macintosh computer.

As shown in FIG. 17, the computer system 1701, which is a form of a data processing system, includes a bus 1702 which is coupled to a microprocessor 1703 and a ROM 1707 and volatile RAM 1705 and a non-volatile memory 1706. The microprocessor 1703, which may be, for example, a G3, G4, or G5 microprocessor from Motorola, Inc. or IBM is coupled to cache memory 1704 as shown in the example of FIG. 17. The bus 1702 interconnects these various components together and also interconnects these components 1703, 1707, 1705, and 1706 to a display controller and display device 1708 and to peripheral devices such as input/output (I/O) devices which may be mice, keyboards, modems, network interfaces, printers, scanners, video cameras and other devices which are well known in the art. Typically, the input/output devices 1710 are coupled to the system through input/output controllers 1709. The volatile RAM 1705 is typically implemented as dynamic RAM (DRAM) which requires power continually in order to refresh or maintain the data in the memory. The non-volatile memory 1706 is typically a magnetic hard drive or a magnetic optical drive or an optical drive or a DVD RAM or other type of memory systems which maintain data even after power is removed from the system. Typically, the non-volatile memory will also be a random access memory although this is not required. While FIG. 17 shows that the non-volatile memory is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 1702 may include one or more buses connected to each other through various bridges, controllers and/or adapters as is well known in the art. In one embodiment the I/O controller 1709 includes a USB (Universal Serial Bus) adapter for controlling USB peripherals, and/or an IEEE-1394 bus adapter for controlling IEEE-1394 peripherals.

In one embodiment of the present invention, at least some of the components can be actively throttled to trade performance for power usage. For example, the microprocessor 1703 may have different core voltage and frequency settings.

In one embodiment of the present invention, the system 1701 further includes power usages sensor(s) 1711 that are coupled to the I/O controller(s) 1709. One or more sensors may be used to determine the power usage of the Central Processing Unit (CPU) (e.g., microprocessor 1703) and/or the Graphical Processing Unit (GPU) (e.g., a processor of the display controller 1708). Further, one or more sensor may be directly coupled to the CPU and/or GPU. The power usage sensor(s) 1711 may include one or more current sensors measuring the actual current drawn by the throttled components, and/or the actual current drawn by the throttled components, and/or the actual current drawn by the system. In one embodiment, the power usage sensor(s) 1711 may include a crude power usage sensor for a non-throttled component to determine the global state of the component, which can be used to dynamically estimate the power usage requirement of the component.

In one embodiment of the present invention, the microprocessor 1703 dynamically budgets power usage and determines throttle settings according to instruction stored in cache 1704, ROM 1707, RAM 1705, and/or nonvolatile memory 1706. Alternatively, the system 1701 further includes a microcontroller (not shown in FIG. 17) to dynamically budget power usage and determine throttle settings. In one embodiment, the data processing system may include multiple central processing unit (CPU)/microprocessors.

It will be apparent from this description that aspects of the present invention may be embodied, at least in part, in software. That is, the techniques may be carried out in a computer system or other data processing system in response to its processor, such as a microprocessor or a microcontroller, executing sequences of instructions contained in a memory, such as ROM 1707, volatile RAM 1705, non-volatile memory 1706, cache 1704, or other storage devices, or a remote storage device. In various embodiments, hardwired circuitry may be used in combination with software instructions to implement the present invention. Thus, the techniques are not limited to any specific combination of hardware circuitry and software nor to any particular source for the instructions executed by the data processing system. In addition, throughout this description, various functions and operations are described as being performed by or caused by software code to simplify description. However, those skilled in the art will recognize what is meant by such expressions is that the functions result from execution of the code by a processor, such as the microprocessor 1703, or a microcontroller.

A machine readable medium can be used to store software and data which when executed by a data processing system causes the system to perform various methods of the present invention. This executable software and data may be stored in various places including for example ROM 1707, volatile RAM 1705, non-volatile memory 1706 and/or cache 1704 as shown in FIG. 17. Portions of this software and/or data may be stored in any one of these storage devices.

Thus, a machine readable medium includes any mechanism that provides (i.e., stores and/or transmits) information in a form accessible by a machine (e.g., a computer, network device, personal digital assistant, manufacturing tool, any device with a set of one or more processors, etc.). For example, a machine readable medium includes recordable/non-recordable media (e.g., read only memory (ROM); random access memory (RAM); magnetic disk storage media; optical storage media; flash memory devices; etc.), as well as electrical, optical, acoustical or other forms of propagated signals (e.g., carrier waves, infrared signals, digital signals, etc.); etc.

The methods of the present invention can be implemented using dedicated hardware (e.g., using Field Programmable Gate Arrays, or Application Specific Integrated Circuit) or shared circuitry (e.g., microprocessors or microcontrollers under control of program instructions stored in a machine readable medium. The methods of the present invention can also be implemented as computer instructions for execution on a data processing system, such as system 1701 of FIG. 17.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A data processing system, comprising:
one or more first components capable of being dynamically throttled to a plurality of different performance level settings;
one or more sensors to determine a power consumption history of at least a portion of the data processing system; and
a power supply coupled to supply a power to the portion of the data processing system including at least the one or more first components, the power supply being limited to a continuous state power capacity;
wherein a worst case power consumption of the data processing system from the power supply exceeds the continuous state power capacity, while an average of power consumption of the data processing system over time is configured to be under the continuous state power capacity, wherein the average of power consumption of the data processing system over time is determined based on the power consumption history for a first time interval and a hypothetical worst-case power consumed by the one or more first components for a second time interval subsequent to the first time interval.

2. The data processing system of claim 1, wherein an average of power consumption from the power supply approaches the continuous state power capacity when the data processing system runs a continuous worst case workload.

3. The data processing system of claim 2, wherein the data processing system comprises a control element which dynamically throttles the one or more first components according to the power consumption history to limit the average of power consumption to be under the continuous state power capacity.

4. The data processing system of claim 3, wherein the one or more first components comprise the control element which comprises a microprocessor.

5. The data processing system of claim 1, wherein at least some of the one or more sensors are implemented using software.

6. A data processing system, comprising:
one or more first components capable of being dynamically throttled to a plurality of different performance level settings; and
one or more sensors to determine a power consumption history of at least a portion of the data processing system, the portion including the one or more first components;
wherein a power consumption state of the first components is set, for a limited period of continuous time, to exceed a continuous state power capacity of a power supply, while an average of power consumption of the data processing system over time is configured to be under the continuous state power capacity of the power supply, wherein the average of power consumption of the data processing system over time is determined based on the power consumption history for a first time interval and a hypothetical worst-case power consumed by the one or more first components for a second time interval subsequent to the first time interval.

7. The data processing system of claim 6, wherein the power consumption state of the first components is set according to the power consumption history.

8. The data processing system of claim 7, wherein the power consumption state of the first components is adjusted over time to keep an average of power consumption from the power supply under the continuous state power capacity.

9. The data processing system of claim 6, wherein at least some of the one or more sensors are implemented using software.

10. A data processing system, comprising:
a plurality of non-throttled subsystems, each capable of consuming a set of different power levels; and
a sensor coupled to each of the plurality of non-throttled subsystems to derive a combined measurement of power consumption of the plurality of non-throttled subsystems, wherein the combined measurement of power consumption of the plurality of non-throttled subsystems is used to maintain an average power consumption of the data processing system over time under a limit, wherein the average of power consumption of the data processing system over time is determined based at least on a history of the power consumption of the data processing system for a first time interval, and a hypothetical worst-case power consumed by the plurality of non-throttled subsystems for a second time interval subsequent to the first time interval.

11. The data processing system of claim 10, wherein each of the non-throttled subsystems cannot be regulated for power consumption by a component which is not part of each of the non-throttled subsystems.

12. The data processing system of claim 10, further comprising:
one or more throttled subsystems, each capable of being dynamically throttled to a plurality of different performance level settings;
wherein the combined measurement is used to dynamically throttle the one or more throttled subsystems.

13. The data processing system of claim 12, further comprising:
a sensor coupled to each of one or more throttled subsystems to derive a combined measurement of power consumption of the one or more throttled subsystems;
wherein the combined measurement of power consumption of the plurality of non-throttled subsystems and the combined measurement of power consumption of the one or more throttled subsystems are used to dynamically throttle the one or more throttled subsystems and keep power consumption under the limit.

14. The data processing system of claim 10, wherein the sensor is implemented using software.

\* \* \* \* \*